US012639865B2

(12) United States Patent　　　　(10) Patent No.:　US 12,639,865 B2

Wu et al.　　　　　　　　　　　　　(45) Date of Patent:　　May 26, 2026

(54) GRAPH LAYOUT RETENTION USING HIDDEN EDGES

(71) Applicant: ServiceNow, Inc., Santa Clara, CA (US)

(72) Inventors: Min Wu, Pleasanton, CA (US); Zhe Wang, San Francisco, CA (US); Yaron Guez, San Diego, CA (US); Nicandro Floro Malveda Vergara, San Diego, CA (US); Jan Ove Kristian Olsson, Castro Valley, CA (US); Justin Jonathan Shaw, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 110 days.

(21) Appl. No.: 18/619,889

(22) Filed: Mar. 28, 2024

(65) Prior Publication Data

US 2025/0308103 A1　　　Oct. 2, 2025

(51) Int. Cl.
　　*G06T 11/20*　　　(2026.01)
　　*G06F 16/901*　　　(2019.01)
　　*G06F 16/904*　　　(2019.01)
(52) U.S. Cl.
　　CPC ........　*G06T 11/206* (2013.01); *G06F 16/9024* (2019.01); *G06F 16/904* (2019.01)
(58) Field of Classification Search
　　None
　　See application file for complete search history.

(56) References Cited

U.S. PATENT DOCUMENTS

| | | | | |
|---|---|---|---|---|
| 6,897,885 B1 * | 5/2005 | Hao | .................... | G06F 16/9577 |
| | | | | 707/E17.011 |
| 2020/0050632 A1 * | 2/2020 | Zhang | ................. | G06F 16/9024 |
| 2020/0104425 A1 * | 4/2020 | Shin | ..................... | G06F 16/904 |
| 2023/0237096 A1 | 7/2023 | Bullard et al. | | |
| 2023/0334093 A1 | 10/2023 | Garduno Hernandez | | |

FOREIGN PATENT DOCUMENTS

CN　　　　109388716 A　　　2/2019

OTHER PUBLICATIONS

Cerven Ken: "Network graph analysis and visualization with Gephi: visualize and analyze your data swiftly using dynamic network graphs built with Gephi"; Jan. 1, 2013 (XP093281905) [retrieved from https://webpages.iust.ac.ir/h_rahmani/gephi/Manual/Network%20Graph%20Analysis%20and%20Visualization%20with%20Gephi%20(2).pdf]; 116 pgs.
Unknown: "Gephi: Using filters"; Apr. 10, 2023 (XP093281926) [retrieved https://seinecle.github.io/gephi-tutorials/generated-pdf/using-filters-en.pdf]; 27 pgs.
International Search Report and Written Opinion for PCT Application No. PCT/US2025/020347 dated Jun. 17, 2025; 10pgs.

* cited by examiner

*Primary Examiner* — Michael J Cobb
(74) *Attorney, Agent, or Firm* — FLETCHER YODER PC

(57)　　　　ABSTRACT

Various implementations disclosed herein include receiving an input indicating an edit to a graph, the graph including a plurality of nodes connected by a plurality of edges, and modifying the graph according to the input. Upon determining that the modification causes a node of the graph to be isolated, a hidden edge is generated to connect the node to at least one other node of the graph.

20 Claims, 18 Drawing Sheets

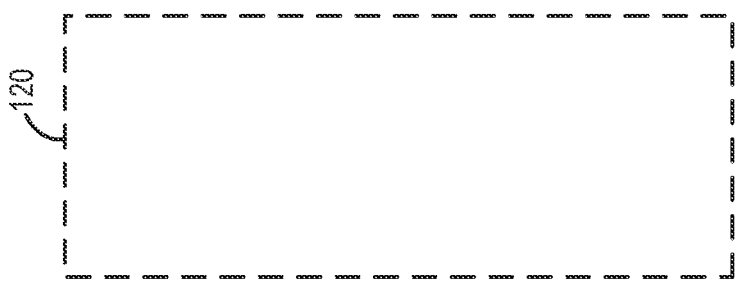
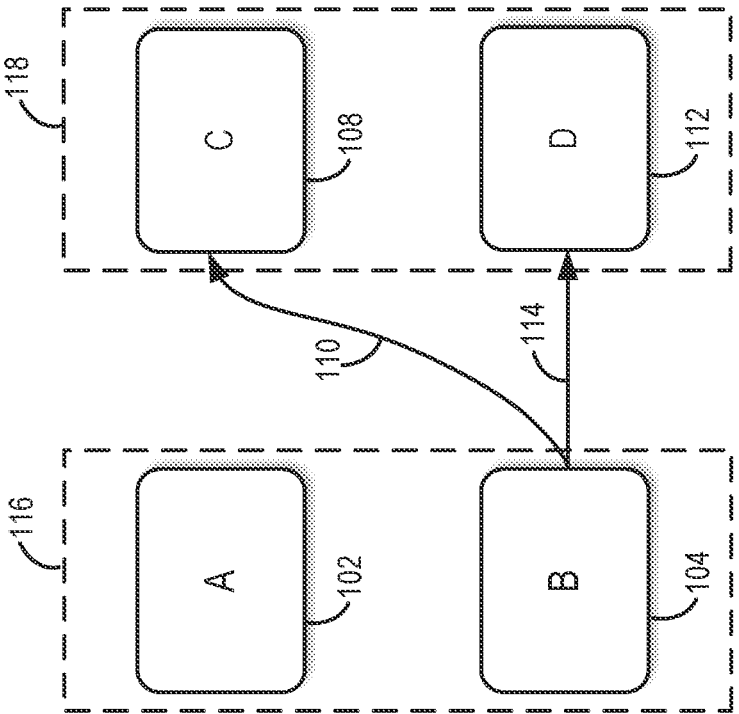
FIG. 2
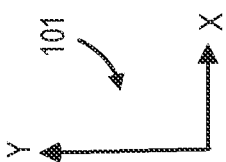

1700

1702

Receive Indication Of Modification To Graph

1704

Node Isolated?

No → 1706

Do Not Insert Hidden Edge

Yes

1708

Insert Hidden Edge

1710

Provide Notification Of Unavailable State Of Digraph

1712

Digraph Adjusted to Available State?

No → 1714

Maintain Current Status Of Digraph

Yes

1716

Remove Hidden Edge

GRAPH LAYOUT RETENTION USING HIDDEN EDGES

TECHNICAL FIELD

The present disclosure relates to using data structures to preserve a layout of a directed graph during modification of the directed graph.

BACKGROUND

In modern computing systems and environments, and as businesses increasingly rely on technology for their day-to-day operations, directed graphs (digraphs) may be used to organize activities and processes according to a desired workflow. A digraph is a visual representation of a set of interconnected elements, which may be displayed as a set of nodes with dependencies illustrated as edges. The edges may be lines connecting the nodes, where each edge starts at a start node and ends at an end node. Edges may be implemented as directed edges which may indicate a flow of activity from a start node to an end node. A user may modify or edit a digraph by adding and deleting nodes and/or edges of the digraph. Such modification or editing of the digraph, however, may cause unexpected changes to a diagraph in a way that requires additional labor and computing resources to reestablish the correct positions of the nodes.

SUMMARY

A system and method of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The method includes obtaining a graph which may include: a plurality of nodes; and a plurality of edges, where each node of the plurality of nodes is interconnected to at least one other node from the plurality of nodes via a respective edge of the plurality of edges, and where each edge of the plurality of edges may include a respective starting point at a respective start node and a respective end point at a respective end node. The method also includes receiving, via a user interface, an input indicating an edit to the graph. The method also includes, in response to receiving the edit: modifying, based on the edit, the graph; and determining that modifying the graph based on the edit causes a particular node of the graph to be isolated. In response to determining that modifying the graph based on the edit causes the particular node of the graph to be isolated, the method may further include generating a hidden edge which may include an invisible graphical user element to connect the particular node of the graph to at least one other node of the plurality of nodes of the graph. Other embodiments of this aspect include corresponding computer systems, apparatus, and computer programs recorded on one or more computer storage devices, each configured to perform the actions of the methods.

Implementations may include one or more of the following features. The edit may include causing edges having an end point at the particular node to be deleted. Generating the hidden edge may include inserting the invisible graphical user element between a node of the plurality of nodes precedent to the particular node and the particular node. The hidden edge may include a data structure that is maintained in a display of the graph. Generating the hidden edge may include storing the invisible graphical user element separate from process data of the graph. Generating the hidden edge may also include maintaining a position of the particular node in the graph unchanged relative to the position of the particular node prior to receiving the input indicating the edit. The method may further include: determining that modifying the graph according to the input indicating the edit does not cause the particular node of the graph to be isolated; and maintaining, based on the determination, a layout of the graph without generating the hidden edge. Implementations of the described techniques may include hardware, a method or process, or computer software on a computer-accessible medium.

One general aspect includes a system. The system also includes one or more processors. The system also includes memory, including computer-executable instructions that, if executed by the one or more processors, cause the system to: obtain a graph, which may include: a plurality of nodes; and a plurality of edges, where each node of the plurality of nodes is interconnected to at least one other node from the plurality of nodes via a respective edge of the plurality of edges, and where each edge of the plurality of edges may include a respective starting point at a respective start node and a respective end point at a respective end node; receive, via a user interface, an input indicating an edit to the graph; in response to receiving the edit: modify, based on the edit, the graph; and determine that modifying the graph based on the edit causes a particular node of the graph to be isolated. The instructions may further cause the one or more processor to, in response to determining that modifying the graph based on the edit causes the particular node of the graph to be isolated: generate a hidden edge which may include an invisible graphical user element to connect the particular node of the graph to at least one other node of the plurality of nodes of the graph. Other embodiments of this aspect include corresponding computer systems, apparatus, and computer programs recorded on one or more computer storage devices, each configured to perform the actions of the methods.

Implementations may include one or more of the following features. The system further includes computer-executable instructions to remove the hidden edge from the graph in response to receiving a subsequent input indicating a subsequent edit to the graph, where the subsequent edit to the graph may include addition of a new edge to the particular node. The new edge may have a respective end point at the particular node and a respective start point at a node of the plurality of nodes that precedes the particular node in the graph. The edit may include deletion of a node of the plurality of nodes, the node may include greater than a threshold number of incoming nodes and/or greater than a threshold number of outgoing nodes, and one or more additional hidden edges may be generated in response to the deletion of the node. The graph may be used to depict process flows for project management, where the plurality of nodes may be one or more of tasks, activities, and entities, and the plurality of edges may be directed edges indicating dependencies between the plurality of nodes. The edit may include shifting of an end point of an edge from the particular node to an incoming node of the plurality of nodes, the edge being an only incoming edge to the particular node, and where the hidden edge is inserted between the incoming node and the particular node. Implementations of the described techniques may include hardware, a method or process, or computer software on a computer-accessible medium.

One general aspect includes a non-transitory computer-readable storage medium having stored thereon executable instructions which may obtain a graph including: a plurality of nodes; and a plurality of edges, where each node of the plurality of nodes is interconnected to at least one other node from the plurality of nodes via a respective edge of the plurality of edges, and where each edge of the plurality of edges may include a respective starting point at a respective start node and a respective end point at a respective end node. The medium may also receive, via a user interface, an input indicating an edit to the graph. The medium may also, in response to receiving the edit: modify, based on the edit, the graph; and determine that modifying the graph based on the edit causes a particular node of the graph to be isolated. The medium may also, in response to determining that modifying the graph based on the edit causes the particular node of the graph to be isolated: generate a hidden edge which may include an invisible graphical user element to connect the particular node of the graph to at least one other node of the plurality of nodes of the graph. Other embodiments of this aspect include corresponding computer systems, apparatus, and computer programs recorded on one or more computer storage devices, each configured to perform the actions of the methods.

Implementations may include one or more of the following features. The non-transitory computer-readable storage medium may further include executable instructions to store hidden edge as a data structure used for user interface specific data. The hidden edge may not be persisted to process data of the graph. The graph may be in a temporarily unavailable state when the hidden edge is generated. The graph may adjust from a temporary unavailable state to an available state when the hidden edge is removed from the graph. The hidden edge may be removed from the graph when a new edge is added to the graph, the new edge including an end point at the particular node. The graph may be a digraph and the plurality of edges may be directed edges. Implementations of the described techniques may include hardware, a method or process, or computer software on a computer-accessible medium.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Various embodiments in accordance with the present disclosure will be described with reference to the drawings, in which:

FIG. 2 illustrates a graph layout, without insertion of a hidden edge, after deletion of an incoming directed edge of the directed graph of FIG. 1, according to at least one embodiment;

DETAILED DESCRIPTION

Figure 1:
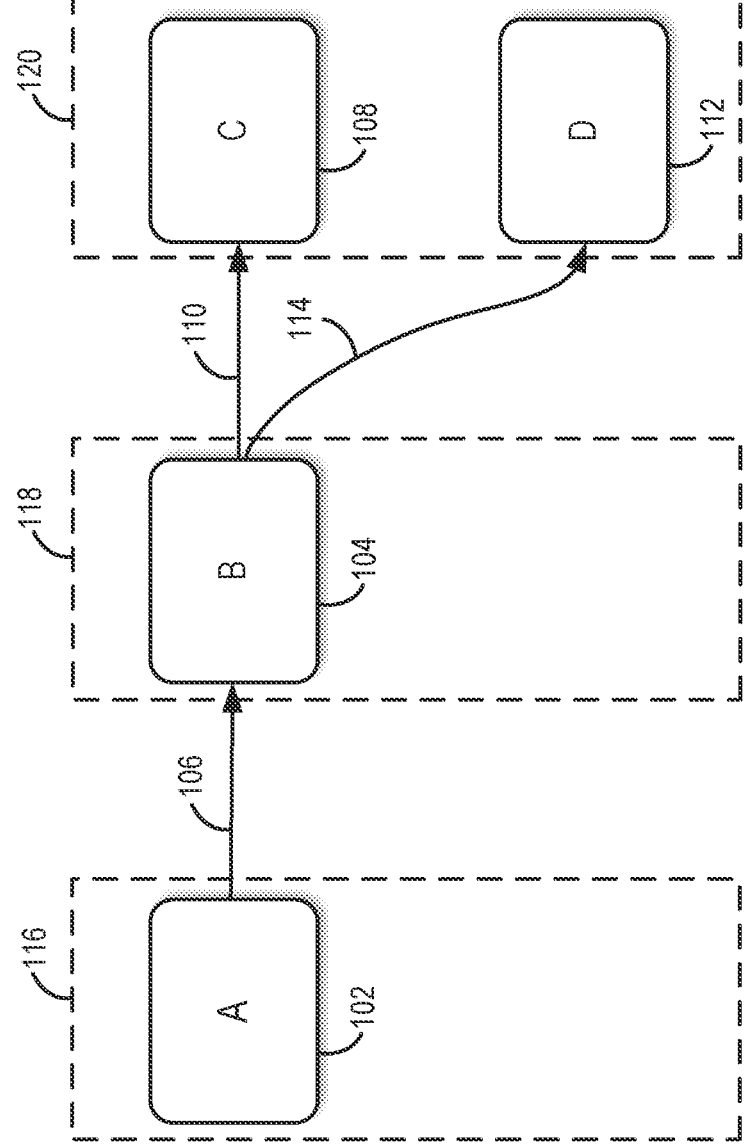
FIG. 1 illustrates an example of a directed graph, according to at least one embodiment.
Figure 1:
Figure 1:
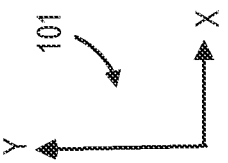

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described.

Directed graphs (digraphs) are data structures that store data in vertices or nodes which may be connect to one another by directional edges, shown as arrows. These data structures may be used for a variety of applications. For example, digraphs may depict social networks, where each node may be a person, and the edges may show relationships between people. As another example, digraphs may be used by businesses and corporations for project management, where the nodes represent tasks, activities, or entities, and the directed edges indicate dependencies between the nodes.

A digraph may be stored at memory of a processing unit (e.g., processor). In at least one embodiment, the digraph, including all data pertaining to the nodes and directed edges, hereafter referred to as process data, may be stored at a storage location such as a database. As the digraph may be utilized as a user tool that a user may manipulate by modifying elements of the digraph, changes to the digraph may be persisted to the storage location. For example, the user may add or delete nodes and directed edges of a digraph, or alter how the nodes are connected by the directed edges to reflect desired changes to activity paths, e.g., a flow of activity indicated by the directed edges. These changes may be saved to a database storing the process data of the digraph. The activity paths may also be referred to as process flows.

In at least one embodiment, for project management, digraphs may be used to efficiently represent desired or target process flows for completion of a project. For example, an order that the nodes are to be performed may be indicated by the directed edges. A node may have incoming edges, which may be directed edges pointing from nodes precedent to (e.g., to be performed before) the node, as well as outgoing edges, which may be directed edges pointing from the node to a subsequent (e.g., to be performed after) node. A user may modify or edit a digraph by adding and deleting both the directed edges and the nodes, as well as by adjusting how the directed edges connect the nodes. Modification of the digraph may, however, lead to undesirable changes to a layout (e.g., an ordering of the nodes as well as an organization of the directed edges) of the digraph.

In at least one embodiment, deletion of directed edges may lead to isolation of at least one node and place the digraph in an invalid state, according to algorithms describing digraph rules governing a structuring and flow of the digraph. For instance, the digraph rules may control allowable and unallowable positions of the nodes and directed edges. The digraph may be in an invalid state when one or more elements of the digraph are in an unallowable position, which may result in suspension of any further use or processing of the digraph until the digraph is modified such that all elements are in allowable positions (e.g., a valid state of the digraph). In at least one embodiment, further modifications to the digraph may be disabled and rendering or publishing of the digraph may be blocked until an element detected to be in an unallowable position is adjusted to an allowable position. In addition, an error message may be displayed to the user to notify the user of the invalid state of the digraph and persisting of unallowed positioning of the digraph elements to the database storing the process data may not be permitted. For example, isolation of a node may occur when all incoming edges to the node are deleted, which may be an unallowable position of the node. As a result, the digraph layout may be automatically adjusted to a default valid state by either deleting the node or re-positioning the node. This may disrupt a sequence of a desired process flow illustrated by the digraph and alter an ordering of the nodes.

As an example, the digraph may be organized according to a layout that displays vertical layers along a horizontal axis. The vertical layers may include nodes and directed edges may be depicted as arrows connecting the nodes, where an overall flow of operations is from left to right. In a scenario where node B depends on node A being executed first (e.g., node B is to the right of node A) and the arrow from node A to node B is deleted, node B may be automatically shifted to the left if there are no other incoming edges to node B. For example, node B may be shifted to a left-hand margin of the digraph, to the same vertical layer as node A. This shifting may also shift all the nodes that depend on node B (e.g., nodes to the right of node B and connected to node B) which alters the diagram layout and may disrupt the workflow of a user utilizing the digraph. In other examples, node B may be deleted as a result of isolation.

In order to reverse the alterations to the digraph resulting from deletion of the incoming edges to node B or to add new incoming edges to node B, the user may be required to restore at least some of the previously deleted incoming edges of node B or recreate node B if node B was deleted. Although one option to circumvent automatic rearrangement of the digraph when a node is isolated may be to rewrite the digraph algorithms, this may be laborious and costly.

The present disclosure relates to a method, which may be performed by one or more processors, that may include obtaining a graph comprising a plurality of nodes and a plurality of edges. Each node of the plurality of nodes may be interconnected to at least one other node from the plurality of nodes via a respective edges of the plurality of edges. Each edge of the plurality of edges may include a respective starting point at a respective start node and a respective end point at a respective end node. The method may also include receiving, via a user interface, an input indicating an edit to the graph and, in response to receiving the edit, modifying the graph based on the edit. The method may further include determining that modifying the graph causes a particular node of the graph to be isolated, and, in response to determining that modifying the graph based on the edit causes the particular node of the graph to be isolated, generating a hidden edge comprising an invisible graphical user element to connect to the particular node of the graph to at least one other node of the plurality of nodes of the graph.

Using the methods described herein, a layout of a digraph may thereby be maintained through user edits. In at least one embodiment, invisible graphical user elements are implemented to maintain the digraph layout as various components of the digraph are edited and/or deleted. The hidden edges may include a data structure that is maintained in the display of the digraph, though not visible to an end user. For example, if a user deletes every incoming edge connected to a particular node in the digraph, the incoming edges may be deleted from the display and the changes may be persisted to storage (e.g., a database storing process data of the digraph). From the user's perspective, the incoming edges are successfully deleted and process execution logic (e.g., process data) corresponding to the digraph may be updated accordingly. At least one hidden edges may be inserted into the digraph, however, to replace one or more of the deleted incoming edges in order to preserve the position of the particular node.

When the user connects a new edge to the particular node, the hidden edge may no longer be needed to preserve the position of the particular node and may be removed. In other, additional embodiments, various types of modifications to the digraph may be managed via the methods described herein, including adding, moving, deleting, re-routing edges, as well as adding and deleting nodes. These modifications may be managed while maintaining an organization and flow of the digraph by utilizing hidden edges.

In at least one embodiment, the hidden edges may not be stored as part of the process data of the digraph. In such instances, the hidden edges may be stored as separate data structures, referred to herein as a user interface (UI) construct, which may be configured for UI specific data. For example, the UI construct may be software for managing features of a digraph that are displayed at a user interface to a user and may be a separate software architecture from a digraph tool used to generate and manipulate the digraph. Application of the UI construct may be readily applied to known digraph applications without demanding modification to the process data.

FIG. 1 illustrates an example of a digraph 100 that includes components such as nodes (e.g., A, B, C, and D) that are connected by edges (connections extending between the plurality of nodes). In at least one embodiment, the edges may be implemented as directed edges that indicate a directionality of a process flow of the digraph. Algorithms (e.g., code) for generating, modifying, and otherwise managing the digraph may be implemented at a computing device, such as those depicted in FIG. 18 and described further below. The algorithms may include instructions for automatically adjusting elements of the digraph, such as nodes and edges, in response to modifications made to the digraph, e.g., by a user. In at least one embodiment the algorithms may include a digraph tool which may be a set of instructions to scan and monitor a state of the digraph (e.g., temporarily suspended or valid) and select further instructions in response to a detected state of the digraph.

The nodes may be vertices of the digraph 100 that represent objects. In at least one embodiment, the objects may be activities and/or tasks. The directed edges may be arcs or links that connect an ordered pair of nodes. In at least one embodiment, the directed edges are shown as arrows that point from a precedent node to a subsequent node, where the precedent node precedes the subsequent node in an ordering of the nodes.

A set of reference axes 101 are shown in FIG. 1, indicating a vertical y-axis and a horizontal x-axis. The horizontal axes may represent a temporal aspect of the digraph 100. For example, the digraph 100 may represent an order that the plurality of nodes are to be performed, according to a process flow or workflow, that progresses from the left to the right. Further, a direction of the directed edges may depict directional dependencies between the plurality of nodes according to the process flow. As such, as shown in digraph 100, a first node 102 (e.g., node A) is performed before a second node 104 (e.g., node B) based on the relative positionings of the nodes along the horizontal axis. Moreover, node B is not performed until node A is performed, as indicated by a first directed edge 106 connecting node B to node A. Node A may be a start node and a starting point and node B may be an end node and an end point with respect to the first directed edge 106. Node B may also be referred to as a child node of node A and node A may be referred to as a parent node of node B.

Digraph 100 also includes a third node 108 (e.g., node C) connected to and depending from node B, as indicated by a second directed edge 110, and a fourth node 112 (node D) connected to and depending from node B, as indicated by a third directed edge 114. Each of the second and third directed edges 110, 114 point from node B to nodes C and D, respectively, indicating that performance of nodes C and D are dependent on performance of node B. Nodes C and D may be child nodes of node B while node B may be a parent node of nodes C and D. Furthermore, node B is a start node and starting point of the second and third directed edges 110, 114, while nodes C and D are end nodes and end points of the second and third directed edges 110, 114, respectively.

Layers of the digraph 100 are shown as dashed rectangles extending along the vertical axis to indicate that the layers are shown for illustrative purposes and not actually displayed in the digraph 100. The layers indicate nodes of different process flows that are performed concurrently. For example, node A is included in a first layer 116, node B is included in a second layer 118, and each of node C and node D are included in a third layer 120 of the digraph 100. Node C and node D, each depending from node B and belonging to the third layer 120, may be performed concurrently after node B is performed. The first layer 116, which may be a leftmost layer that includes nodes that do not have any node precedent thereto. In other words, nodes in the first layer 116 may not have any incoming directed edges (e.g., arrows connecting to the nodes at a left side of the nodes). Further, the first layer 116 may be a precedent layer to the second layer 118, the second layer may be a precedent layer to the third layer 120, and the first and second layer 116, 118 may both be precedent to the third layer 120. As such, nodes in the first layer 116 may be performed before nodes in the second layer 118 are performed, and the nodes in the second layer 118 may be performed before nodes in the third layer 120 are performed, for example.

A digraph may be modified by a user to adjust an ordering and/or dependencies of the nodes. In at least one embodiment, the user input a desired modification, or edit, to the digraph at a UI, which may include adding or deleting one or more components of the digraph. In at least some instances, however, deletion of certain components may lead to rearrangement of a layout of the digraph. For example, when all incoming directed edges of a particular node are deleted, the digraph may be placed in an invalid state, resulting from loss of dependency on a precedent node at the particular node and isolation of the particular node. The particular node may be automatically shifted, according to algorithms that control a layout and architecture of the digraph, to a first layer of the digraph, as shown in FIG. 2.

An example of a first modified digraph 200 is illustrated in FIG. 2, where the first modified digraph 200 may show a rearrangement of digraph 100 of FIG. 1 after digraph 100 is modified. The rearrangement of digraph 100 to yield the first modified digraph 200 of FIG. 2 may occur in response to deletion, e.g., by a user, of the first directed edge 106 of digraph 100. For any layer of digraph 100, besides the first layer 116, digraph 100 may be in an invalid state if any nodes of any layer subsequent to the first layer 116 do not have any incoming directed edges. Thus, deletion of the first directed edge 106 may cause digraph 100 to be in an invalid state because the first directed edge 106 is the only incoming directed edge of node B.

To compensate for deletion of the only incoming edge to node B, as shown in FIG. 2, node B may be shifted to the left, into the first layer 116 below node A, thus rearranging the first modified digraph 200 into a valid state. Shifting of node B to the left may also cause nodes C and D to be shifted from the third layer 120 to the second layer 118, although in other examples, nodes C and D may instead remain in the third layer 120. As a result, the third layer 120 may be empty and the layout of the digraph may be truncated and collapsed (e.g., along the horizontal axis) due to loss of nodes occupying the third layer 120. Furthermore, in a more complex digraph with more layers and dependencies than digraph 100, the dependencies may be redistributed when the digraph collapses. In at least some embodiments, redistribution of the dependencies may cause the directed edges of the digraph to overlap, creating a complex visual display that may be difficult for a user to follow. Further, even when the first directed edge 106 of digraph 100 is deleted, shifting of node B to the first layer 116 may not be desired by the user but the user may not be readily able to circumvent this rearrangement.

In yet other embodiments, instead of shifting node B to the left, node B may be deleted. As node B is the only incoming edge to both nodes C and D, directed edges may be automatically added to connect nodes C and D to node A, such that nodes C and D depend from node A. Alternatively, nodes C and D may be shifted to the first layer 116 or may be deleted in response to deletion of node B. Regardless of the outcome, the layout of digraph 200 may be altered due to isolation of node B.

Figure 3:
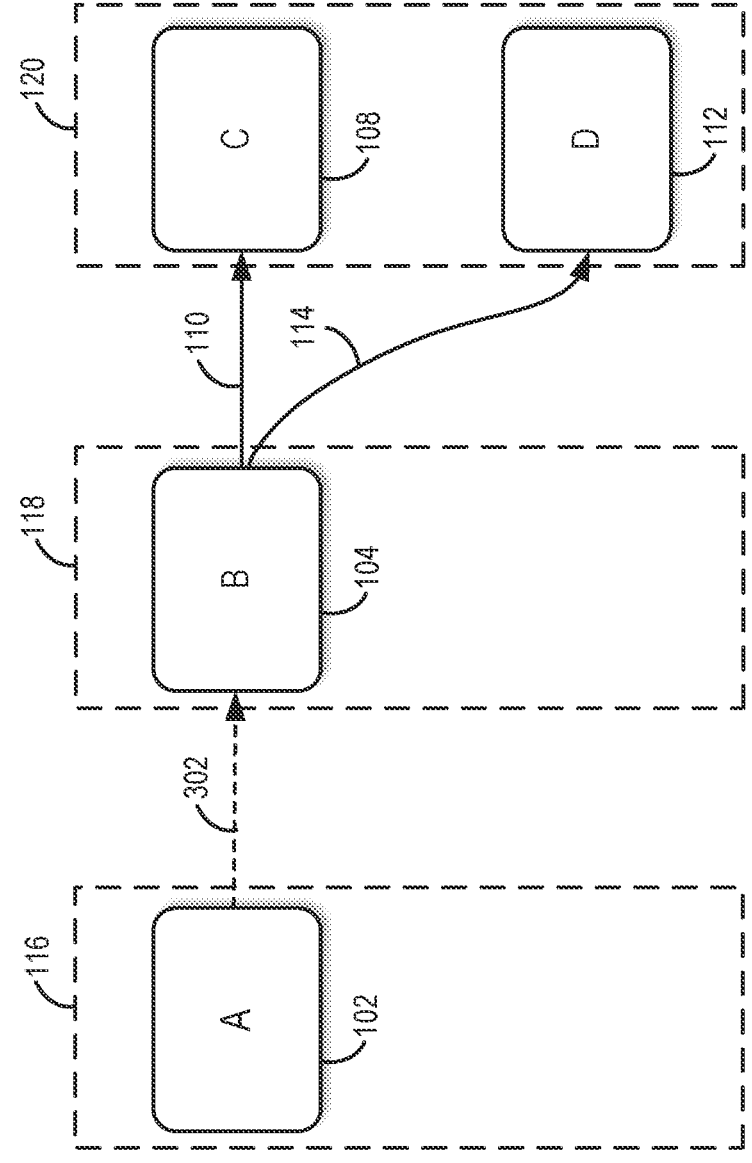
FIG. 3 illustrates a graph layout, with insertion of a hidden edge, after deletion of an incoming directed edge of the directed graph of FIG. 1, according to at least one embodiment.
Figure 3:
Figure 3:
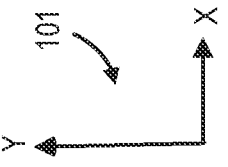

In at least one embodiment, as described herein, a layout of a digraph may be maintained, e.g., not automatically rearranged, even when all incoming directed edges of a dependent node (e.g., a node that depends from at least one precedent node) are deleted. The layout may be maintained by generating hidden edges (as shown in FIG. 3 and described further below) to replace one or more former (and deleted) incoming directed edges. The hidden edges may, as one example, be invisible graphical user elements that connect nodes of the digraph. In at least one embodiment, the hidden edges may be implemented as data structures that may be stored at a construct that is separate from a digraph database of a digraph tool. The construct may be, for instance a mechanism or tool using a language in common with the digraph algorithms and may store data at a different location from the digraph database. For example, the database may store data and code corresponding to nodes, directed edges, and algorithms (e.g., process data) of the digraph. The hidden edges may be stored as separate data structures, e.g., as a UI construct, which may be configured to insert and remove data structures into and from the digraph without altering the process data. The hidden edges may therefore be temporary objects used as placeholders in the digraph to preserve a position of dependent nodes when the digraph is modified.

The hidden edges may also be used to maintain the layout of the digraph when other modifications are made to the digraph, such as addition and deletion of nodes. By inserting the hidden edges, overlapping of multiple directed edges may be minimized, that may otherwise obscure visual clarity of node dependencies. In at least one embodiment, the hidden edges may be invisible, e.g., to a user, and may be implemented as connections between nodes that, unlike directed edges and nodes, are not persisted to the digraph database. For example, a hidden edge may be a temporary connection between nodes that acts as placeholder until a directed edge is added. While the digraph has any hidden edges present, further operations, such as publishing or rendering, may not be performed using the digraph, e.g., the digraph may be in a temporarily unavailable state, until all hidden edges in the digraph have been replaced with directed edges. When the hidden edge have been replaced, the digraph may exit the temporarily unavailable state.

As an example, as illustrated in FIG. 3, a second modified digraph 300 may be a version of digraph 100 of FIG. 1 with a hidden edge 302 (depicted as a dashed arrow) inserted in response to deletion of the first directed edge 106 and resulting in isolation of node B. The second modified digraph 300 may have an unaltered layout from that of digraph 100 due to generation of the hidden edge 302. The hidden edge 302 may be implemented as a UI construct, as described above, and may be invisible to the user at a UI displaying the second modified digraph 300. The hidden edge 302 may be inserted into a position formerly occupied by process data for the first directed edge 106, thereby effectively operating as an incoming directed edge to node B.

The hidden edge 302 may preserve the position of node B by operating as an object that inhibits automatic shifting of node B to the left and consequent rearrangement of the digraph layout. As the hidden edge 302 is not persisted to the digraph database, instructions of a digraph tool, such as a validation engine used to verify digraph state (e.g., temporarily unavailable or available), may identify the second modified digraph 300 to be in a temporarily unavailable state. Further processing or use of the second modified digraph 300, such as publishing or rendering of the digraph, may be suspended until the second modified digraph 300 is further modified to be in an available state. Modification of the second modified digraph 300 to the available state may include addition of a new incoming directed edge, e.g., by the user, to node B. When the new incoming directed edge is added, the hidden edge 302 may be removed from the second modified digraph 300.

As described above, in at least one embodiment, a UI construct may be used to retain a layout of a digraph during modification of the digraph by providing the hidden edges as data structures that may be inserted into the digraph when all incoming directed edges of a node are deleted. The data structures may be stored as the UI construct separate from the process data of the digraph, which may allow the UI construct to be applied to various digraph applications without demanding alterations to the process data, such as rewriting the digraph algorithms. The hidden edges, whether implemented as the UI construct or by other techniques, may also be inserted in response to other modifications to the digraph. Examples of various digraph modifications and corresponding application of data structures are depicted in FIGS. 4-15.

Figure 4:
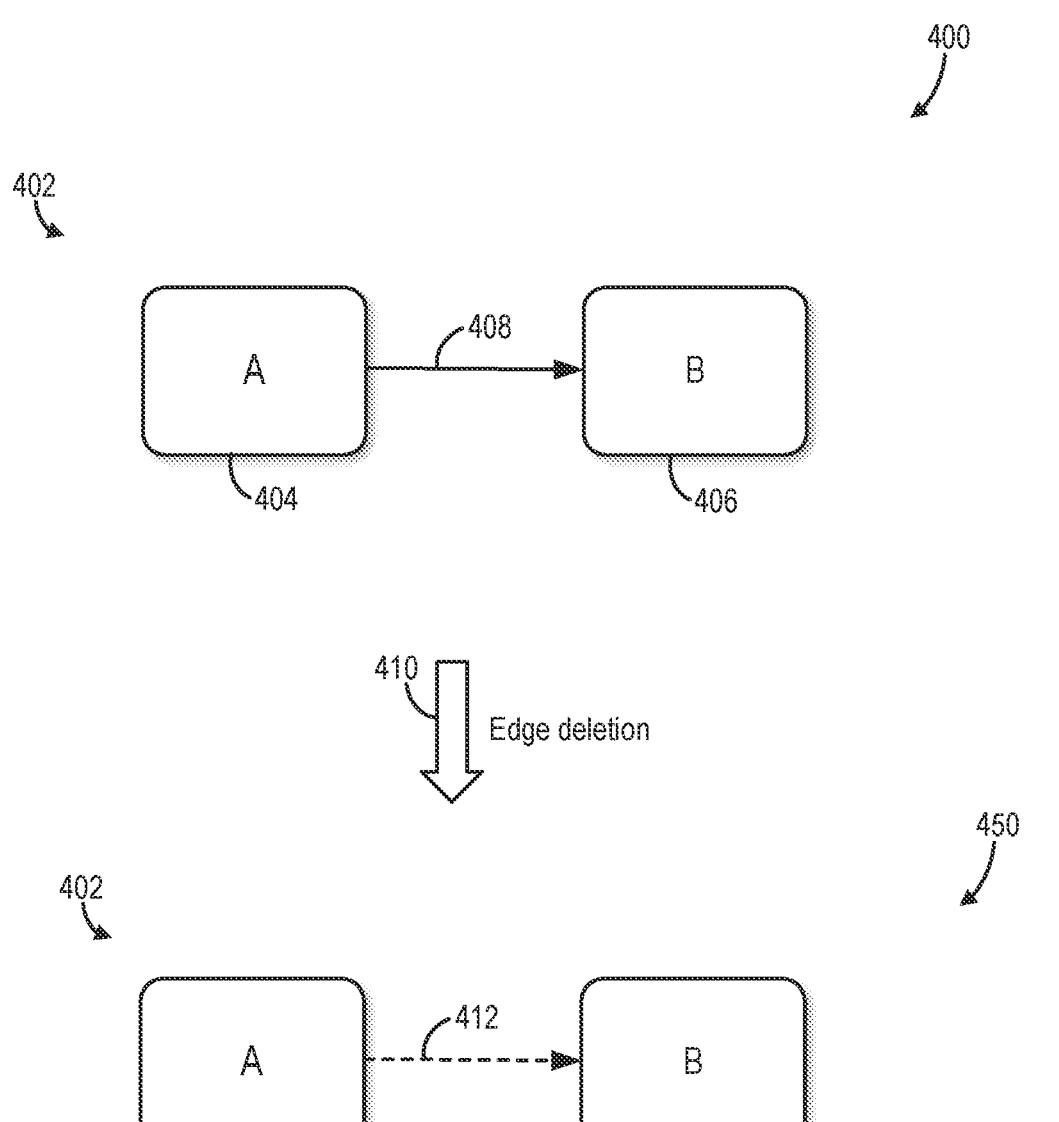
FIG. 4 illustrates a first example of modification to a directed graph, according to at least one embodiment.

A first example of a modification to a graph is illustrated in FIG. 4, in which the only incoming edge to a node is deleted, causing the node to be isolated, and edge deletion logic of one or more algorithms for managing the digraph may be applied. An initial layout 400 of a digraph 402 is shown at an upper portion of FIG. 4 and a subsequent layout 450 of the digraph 402 is shown at a lower portion of FIG. 4. In the initial layout 400, a first node 404 (e.g., node A) is connected to a second node 406 (e.g., node B) by a directed edge 408. The directed edge 408 is an outcoming edge of node A and incoming edge of node B. Further, the directed edge 408 Is the only incoming edge of node B, which may be a dependent node (e.g., depending from node A). In addition, node A may be located in a layer precedent to a layer in which node B is located.

The directed edge 408 may be deleted, as indicated by arrow 410, based on input from a user. When deletion of the directed edge 408 is detected, an algorithm, including edge deletion logic, managing the digraph 402 may include instructions to verify a number of incoming edges to a dependent node (e.g., node B) that are deleted (e.g., the directed edge 408). If the dependent node has no other incoming edges (hidden or not) besides the deleted directed edge, the directed edge that is deleted may be marked as invisible to be replaced by a hidden edge. If the directed edge is not the only incoming edge to the dependent node, the directed edge is deleted. In both instances, the process data is updated with the deletion of the directed edge.

For example, in response to deletion of the directed edge 408, as shown at the subsequent layout 450, an invisible graphical user element, as described above, may be inserted into the digraph 402 to position a hidden edge 412 between node A and node B. The hidden edge 412 may indicate the same direction of dependency between the nodes as the deleted directed edge 408. By inserting the hidden edge 412 into the digraph 402 between node A and node B, a positioning of the nodes is maintained. The invisible graphical user element may similarly be inserted when a node has more than incoming edge and all the incoming edges are deleted. Furthermore, the digraph 402, as shown in the subsequent layout 450, may be in a temporarily unavailable state due to the presence of the hidden edge 412.

For example, when in the unavailable state due to insertion of at least one hidden edge, further processing of the digraph 402 may be suspended, similar to when a digraph is in an invalid state, as described previously. In the unavailable state, however, the digraph 402 is not automatically adjusted to a valid state because an original layout of the digraph is being maintained by the hidden edge 412. Instead, an indication, e.g., a notification, may be provided to the user to alert the user that a modification to the digraph 402 to remove the hidden edge 412 is required before further processing of the digraph 402 can proceed. Other modifications to the digraph 402 may be implemented while the digraph 402 is in the temporarily unavailable state. Once the user modifies the digraph 402 such that the hidden edge 412 may be removed, the digraph 402 may be adjusted to an available state where the user may continue modifying the digraph 402 or proceed to further processing of the digraph 402. In at least one embodiment, the hidden edge 412 may be removed in response to addition of a new directed edge that alleviates isolation of a node, as exemplified in FIGS. 6 and 7, and described further below.

Figure 5:
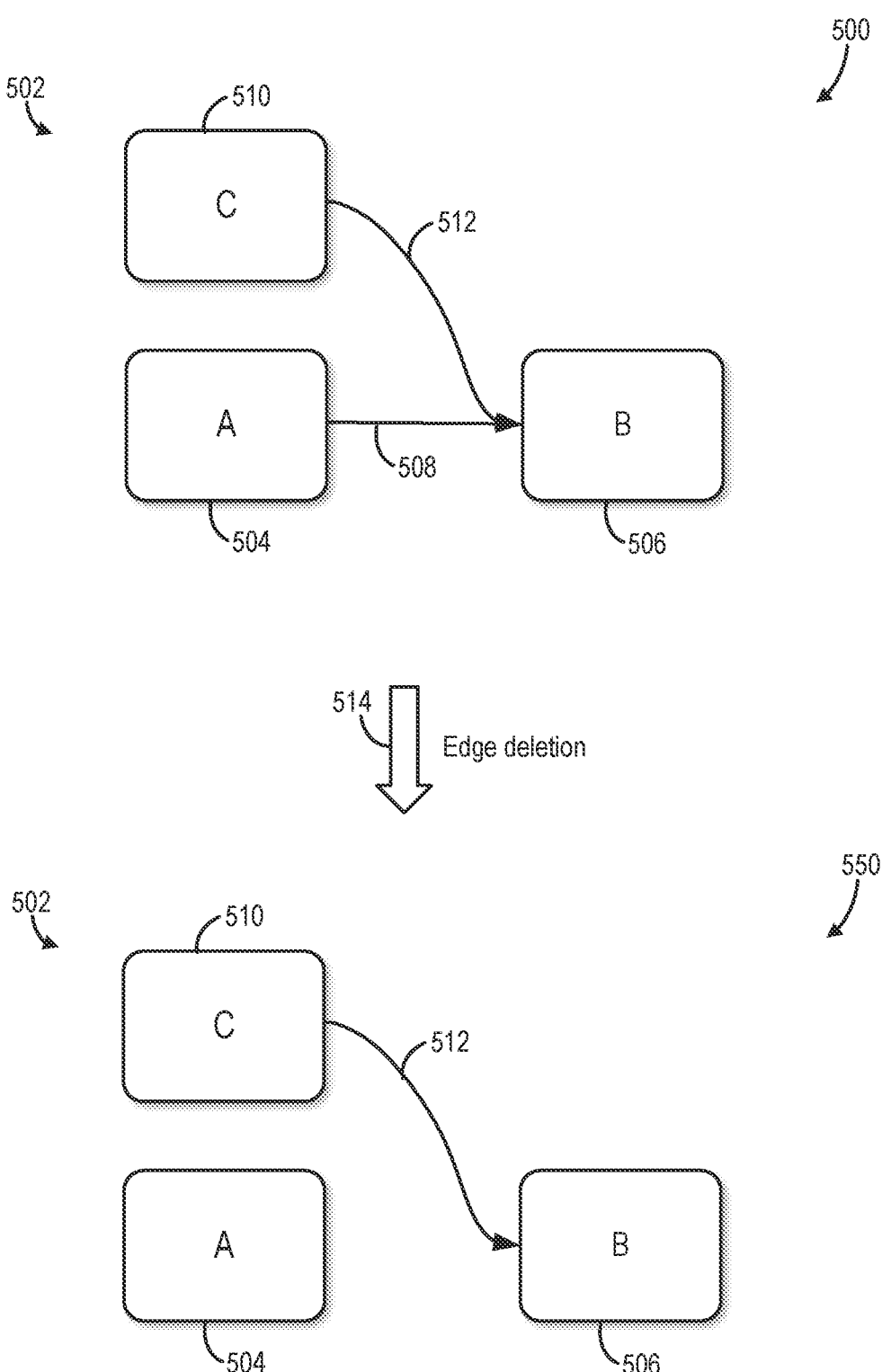
FIG. 5 illustrates a second example of modification to a directed graph, according to at least one embodiment.

A second example of a modification to a graph is illustrated in FIG. 5, in which one incoming directed edge to a node is deleted and edge deletion logic of an algorithm for managing the digraph is applied. An initial layout 500 of a digraph 502 is shown at an upper portion of FIG. 5 and a subsequent layout 550 of the digraph 502 is shown at a lower portion of FIG. 5. In the initial layout 500, a first node 504 (e.g., node A) is connected to a second node 506 (e.g., node B) by a first directed edge 508. The first directed edge 508 is an outcoming edge of node A and incoming edge of node B and node B may be a child node of node A. Further, node A may be located in a layer (e.g., the first, second, and third layers 116, 118, and 120 of FIG. 1) that is precedent to node B.

The digraph 502 also includes a third node 510 (e.g., node C) which may, in at least one embodiment, be located in the same layer as node A. In another embodiment, node C may be in a different layer than node A but precedent to a layer in which node B is located. Node C may be connected to node B by a second directed edge 512, which may be an outgoing edge of node C and an incoming edge of node B. Node B, therefore, has more than one incoming edge.

The first directed edge 508 may be deleted (e.g., by a user), as indicated by arrow 514. Because node B has more than one incoming edge, a position of node B in the digraph 502 may be maintained by the second directed edge 512. The first directed edge 508 may therefore be deleted without demanding insertion of a hidden edge to preserve the position of node B relative to nodes A and C. In additional embodiments where a node has more than one incoming edge and more than one incoming edge is deleted, insertion of a hidden edge may be precluded as long as at least one of the incoming edges is not deleted.

Figure 6:
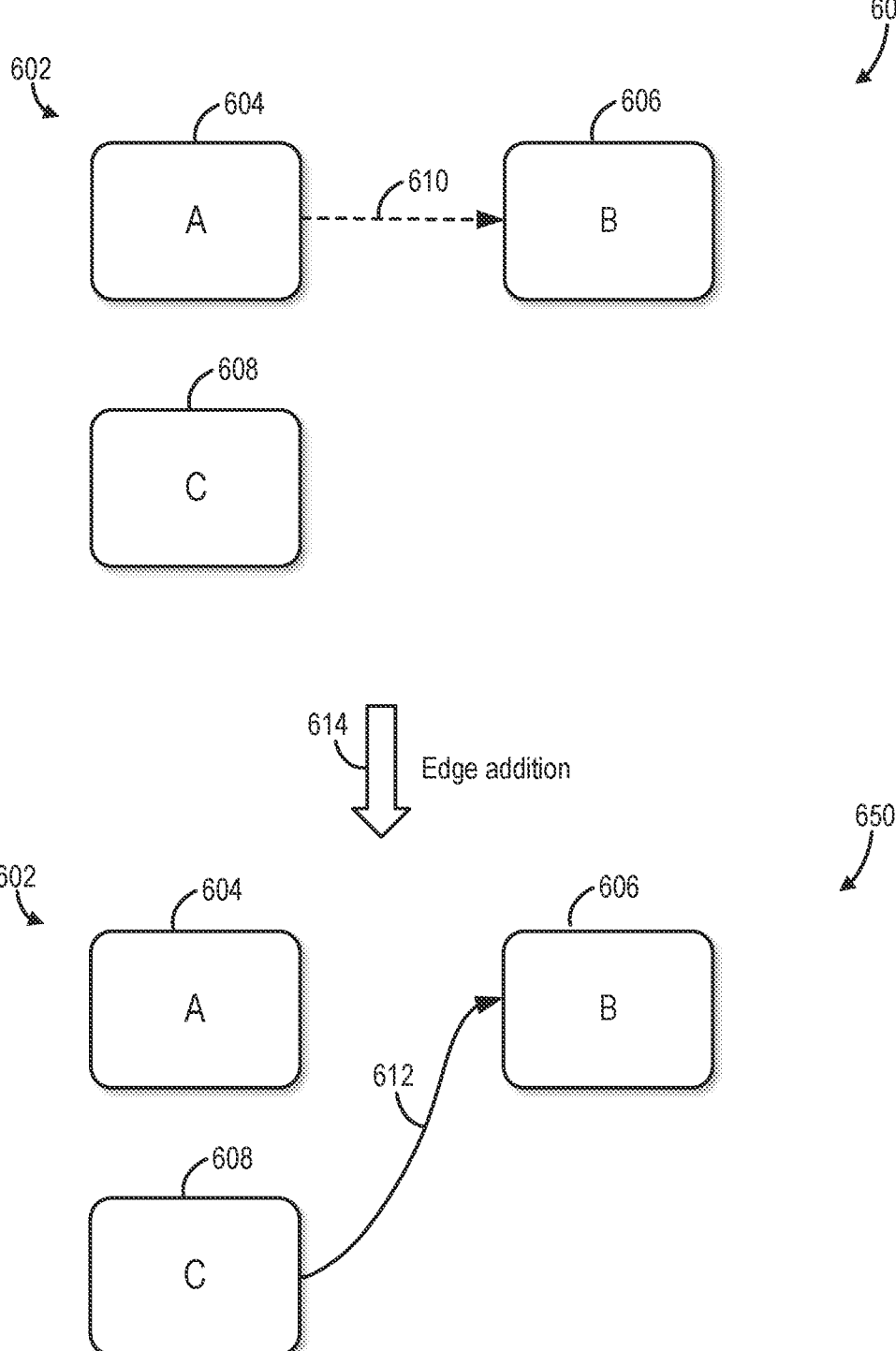
FIG. 6 illustrates a third example of modification to a directed graph, according to at least one embodiment.

A third example of a modification to a graph is illustrated in FIG. 6, in which a hidden edge maintaining a position of node, subsequent to deletion of all incoming edges to the node, is removed due to addition of a new incoming edge to the node. Edge addition logic of one or more algorithms managing the digraph may be applied. An initial layout 600 of a digraph 602 is shown at an upper portion of FIG. 6 and a subsequent layout 650 of the digraph 602 is shown at a lower portion of FIG. 6. In the initial layout 600, the digraph 602 includes a first node 604 (e.g., node A), a second node 606 (e.g., node B), and a third node 608 (e.g., node C). Node A and node C may be in a common layer (e.g., the first, second, and third layers 116, 118, and 120 of FIG. 1) of the digraph 602 or different layers but nodes A and C may be in one or more layers that are precedent to a layer in which node B is located.

A hidden edge 610 is positioned between node A and node B. The hidden edge 610 may be located as shown in FIG. 6 due to insertion of an invisible graphical user element to maintain a position of node B relative to node A, subsequent to deletion of all incoming edges to node B. The hidden edge

610 is depicted as a dashed arrow (as opposed to a solid arrow) to indicate that it is not displayed to a user at a user display or interface. Instead, the hidden edge 610 may be invisible but its presence (e.g., insertion of a corresponding data structure) may be recognized by a validation tool or engine used to evaluate a status of the digraph 602. Further, the digraph 702 may be in a temporarily unavailable state due to the presence of the hidden edge 610.

A directed edge 612 may be added to the digraph 602 (e.g., by a user), as indicated by arrow 614, that connects node C to node B. An algorithm for managing the digraph 602 may include instructions to delete all hidden edges to a dependent node (e.g., node B) to which a new directed edge is added (e.g., the directed edge 612). For example, the directed edge 612 may be an outgoing edge of node C and an incoming edge of node B. When the directed edge 612 is added, the hidden edge 610 may be removed from the digraph 602, causing the hidden edge 610 to be deleted from the digraph 602. In at least one embodiment, the hidden edge 610 may be automatically removed and deleted from the digraph 602 in response to addition of at least one incoming edge to node B. The digraph 602 may no longer be in the temporarily unavailable state due to the removal of the hidden edge 610.

Figure 7:
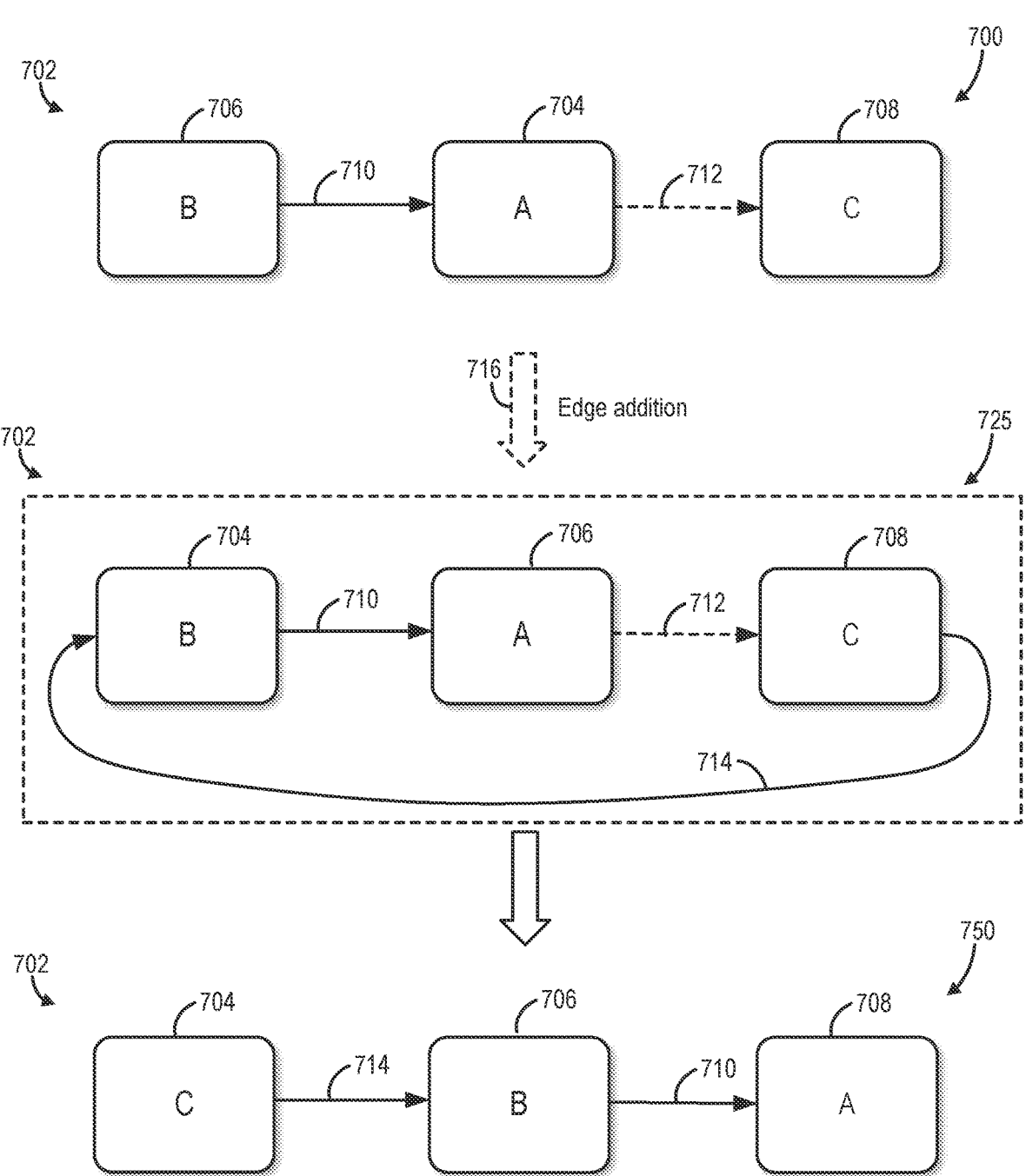
FIG. 7 illustrates a fourth example of modification to a directed graph, according to at least one embodiment.

A fourth example of a modification to a graph is illustrated in FIG. 7, in which a hidden edge that was inserted to maintain a position of node in response to isolation of the node, is removed due to addition of a new directed edge. The addition of the new directed edge, however, may create an undesirable loop. Edge addition logic of one or more algorithms managing the digraph may be applied to mitigate formation of the loop. An initial layout 700 of a digraph 702 is shown at an upper portion of FIG. 7, an intermediate stage 725 of the digraph 702 is shown in a central portion of FIG. 7, and a subsequent layout 750 of the digraph 702 is shown at a lower portion of FIG. 7. The intermediate stage 725 is shown in a dashed box to indicate that a layout of the digraph 702 in the intermediate stage 725 is not actually displayed at a user display or interface but rather depicted in FIG. 7 to illustrate addition of a connection between nodes that triggers rearrangement of the nodes.

The digraph 702 includes a first node 704 (e.g., node A), a second node 706 (e.g., node B), and a third node 708 (e.g., node C). Each of nodes A, B, and C may be located in a different layer (e.g., the first, second, and third layers 116, 118, and 120 of FIG. 1) of the digraph with the layer of node B being precedent to the layer of node A, and the layer of node A being precedent to the layer of node C. A first directed edge 710 connects node B to node A, which may be an outgoing edge of node B and an incoming edge of node A. A hidden edge 712 is positioned between node A and node C which preserves a position of node C after all incoming edges of node C have been deleted. The digraph 702, in the initial layout 700, may in a temporarily unavailable state due to the presence of the hidden edge 712.

A second, new directed edge 714 may be added (e.g., by a user) to the digraph, as indicated by arrow 716, to connect node C to node B. An algorithm for the digraph 702 may include instructions to rearrange a digraph when addition of a new directed edge causes a loop to be formed in the digraph. The instructions may include verifying if a dependent node (e.g., node C) of a hidden edge (e.g., the hidden edge 712) in the digraph has any other incoming edges (hidden or not) besides the hidden edge. If the dependent node does not have any other incoming edges, the new directed edge may be added and the hidden edge is deleted to mitigate formation of the loop. However, if the dependent node has other incoming nodes, the loop is formed upon addition of the new directed edge.

For example, the second directed edge 714 may be an outgoing edge of node C and an incoming edge of node B. Addition of the second directed edge 714 may form a loop, as shown in the intermediate stage 725 of FIG. 7. The loop may place the digraph 702 in an undesirable state due to the presence of the hidden edge 712 maintaining a temporary (e.g., not persisted to a database storing data and values for the digraph 702) connection between node A and node C.

To mitigate formation of the loop in the digraph 702, the hidden edge 712 may be deleted, as the hidden edge 712 is the only incoming edge to node C, even though an incoming edge is not added to node C. The layout of the digraph 702 may further be rearranged to the subsequent layout 750 upon deletion of the hidden edge 712910. In the subsequent layout 750, a linear arrangement of the digraph 702 is maintained and the nodes may be ordered according to a desired sequence based on the first and second directed edges 710, 714. Further, as the hidden edge 712 is removed, the digraph 702 is no longer in the temporarily unavailable state.

Figure 8:
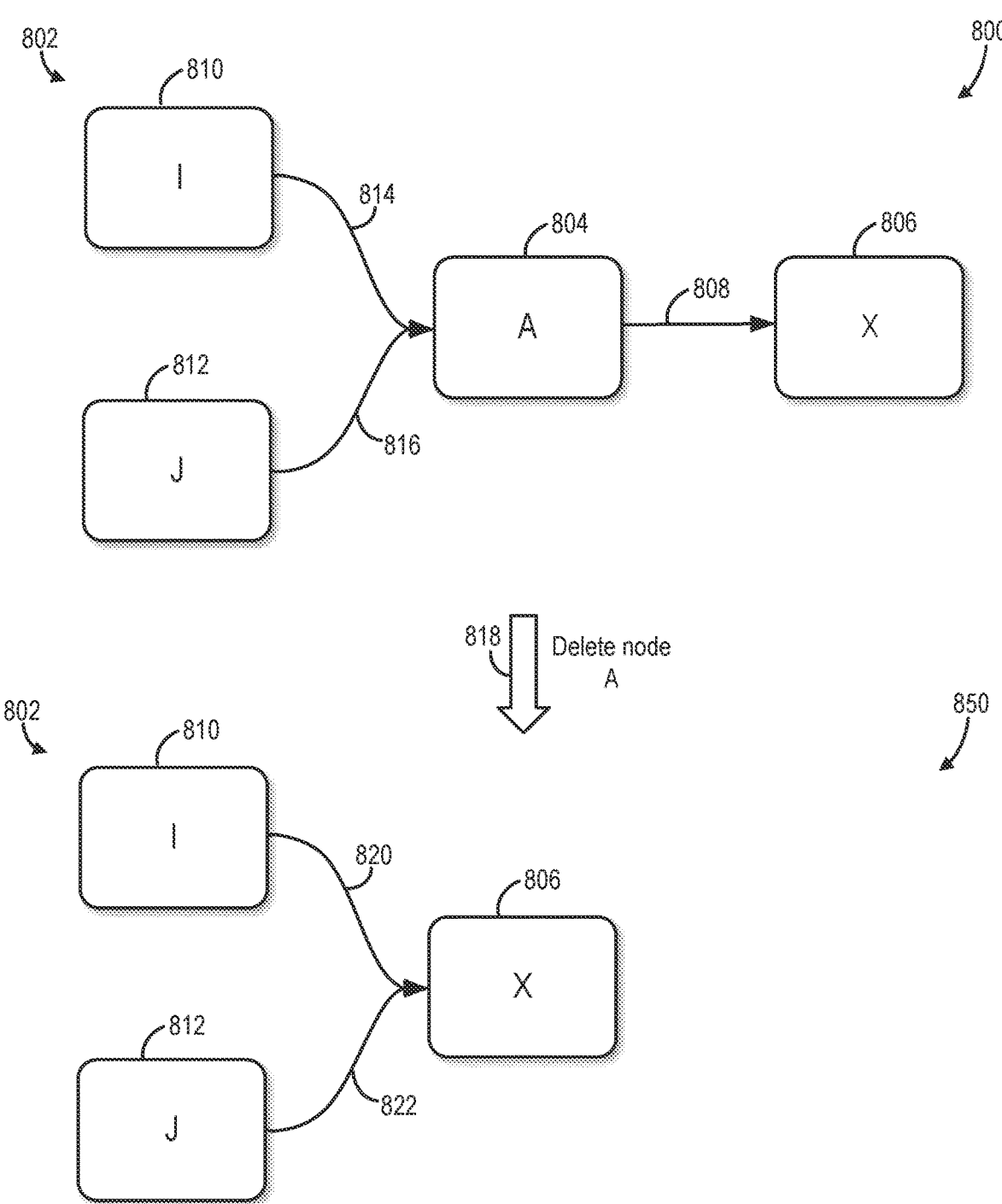
FIG. 8 illustrates a fifth example of modification to a directed graph, according to at least one embodiment.

A fifth example of a modification to a graph is illustrated in FIG. 8, in which a node is deleted and node deletion logic of one or more algorithms managing the digraph may be applied. An initial layout 800 of a digraph 802 is shown at an upper portion of FIG. 8, and a subsequent layout 850 of the digraph 802 is shown at a lower portion of FIG. 8. In the initial layout 800, the digraph 802 includes a first node 804 (e.g., node A) connected to a second node 806 (e.g., node X) by a first directed edge 808 such that node X depends from node A. The first directed edge 808 is an outgoing edge of node A and an incoming edge of node X and node A and node X are in different layers of digraph 802, with node A being located in a layer precedent to a layer that node X is located in.

Each of a third node 810 (e.g., node I) and a fourth node 812 (e.g., node J) may be in one or more precedent layers to a layer that node A is located in. Node I is connected to node A by a second directed edge 814, which is an outgoing edge of node I and an incoming edge of node A, and node J is connected to node A by a third directed edge 816, which is an outgoing edge of node J and an incoming edge of node A. Node A, therefore, has two incoming edges and one outgoing edge.

Node A may be deleted based on user input, as indicated by arrow 818, which may cause the first directed edge 808, the second directed edge 814, and the third directed edge 816 to also be removed from the digraph 802, as instructed by an algorithm of the digraph 802. The algorithm may further include instructions to generate a list of incoming nodes, e.g., nodes that a deleted node depends from and a list of outgoing nodes, e.g., nodes dependent on the deleted node. For example, a list of incoming nodes for the digraph 802, upon deletion of node A, may include nodes I and J, and a list of outgoing nodes may include node X. The algorithm may include instructions to apply edge adding logic to connect each incoming node to each outgoing node of the lists, unless there is already one or more paths in the digraph that includes directed edges or hidden edges between an incoming node and an outgoing node.

As an example, upon deleting node A, node X no longer has an incoming edge and nodes I and J no longer have outgoing edges, which may place the digraph 802 in an invalid state. A valid state of the digraph 802 may be resumed by connecting nodes I and J to node X via a fourth directed edge 820 and a fifth directed edge 822, respectively, as shown in the subsequent layout 850 of the digraph 802.

Generation of the fourth and fifth directed edges 820, 822 may be persisted to process data of the digraph 802. As a result, node X has at least one incoming edge, and each of nodes I and J have at least one outgoing edge. Node X may remain in the same layer as in the initial layout 800 of the digraph 802, or may be shifted to the precedent layer in which node A was located.

Figure 9:
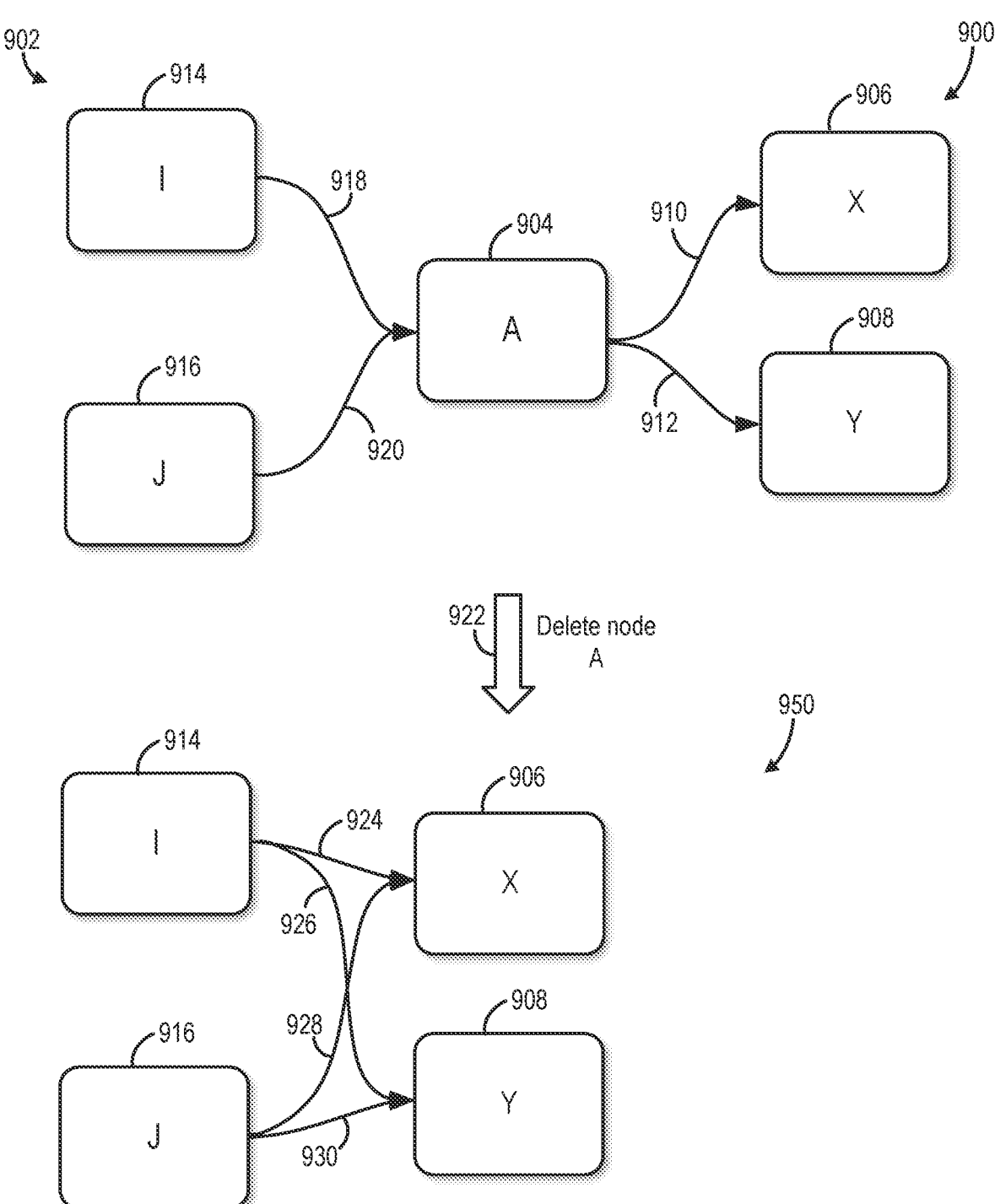
FIG. 9 illustrates a sixth example of modification to a directed graph, according to at least one embodiment.

A sixth example of a modification to a graph is illustrated in FIG. 9, in which a node is deleted and node deletion logic of one or more algorithms managing the digraph may be applied. An initial layout 900 of a digraph 902 is shown at an upper portion of FIG. 9, and a subsequent layout 950 of the digraph 902 is shown at a lower portion of FIG. 9. In the initial layout 900, the digraph 902 includes a first node 904 (e.g., node A) connected to two outgoing nodes, e.g., a second node 906 (e.g., node X) and a third node 908 (e.g., node Y), by a first directed edge 910 and a second directed edge 912, respectively. The first directed edge 910 is an outgoing edge of node A and an incoming edge of node X and the second directed edge 912 is an outgoing edge of node A and incoming edge of node Y. The first node 904 is further connected to two incoming nodes, e.g., a fourth node 914 (e.g., node I) and a fifth node (e.g., node J), by a third directed edge 918 and a fourth directed edge 920, respectively. The third directed edge 918 is an outgoing edge of node I and an incoming edge of node A and the fourth directed edge 920 is an outgoing edge of node J and incoming edge of node A.

In at least one embodiment, node I and node J are in one or more layers that are precedent to a layer that node A is located in, and the layer of node A is precedent to one or more layers that node X and node Y are located in. Node A may be deleted based on user input, as indicated by arrow 922, which causes the incoming edges (e.g., the third and fourth edges 918, 920) and the outgoing edges (e.g., the first and second edges 910, 912) of node A to be also be deleted. An algorithm of the digraph 902 may include instructions, as described above, to generate a list of incoming nodes (e.g., nodes I and J) and a list of outgoing nodes (e.g., nodes X and Y) with respect to node A and create directed edges connecting all incoming nodes to all outgoing nodes.

For example, in the subsequent layout 950 of the digraph 902, node I may be connected to node X by a new, fifth directed edge 924 and to node Y by a new, sixth directed edge 926. Node J may be connected to node X by a seventh directed edge 928 and to node Y by a new, eighth directed edge 930. Generation of the new directed edges may maintain positions of nodes X and Y as subsequent to nodes I and J and retain dependencies between the nodes that reflect an ordering of dependencies of the initial layout 900 of the digraph 902. Nodes X and Y may be shifted into the layer previously occupied by node A, in one example, or may be maintained in the same one or more layers that nodes X and Y occupied in the initial layout 900.

In the subsequent layout 950 of the digraph 902, the added directed edges may be persisted to a database of the digraph 902. For example, data for the added directed edges may be saved to the database to be added to process data of the digraph 902. In instances where a digraph may have numerous nodes connected to a node that is deleted, adding new directed edges to establish new connections between previously unconnected nodes may result in a complex display of the digraph 902 with directed edges that are difficult to follow. In such examples, hidden edges may instead be created, as shown in FIG. 10.

Figure 10:
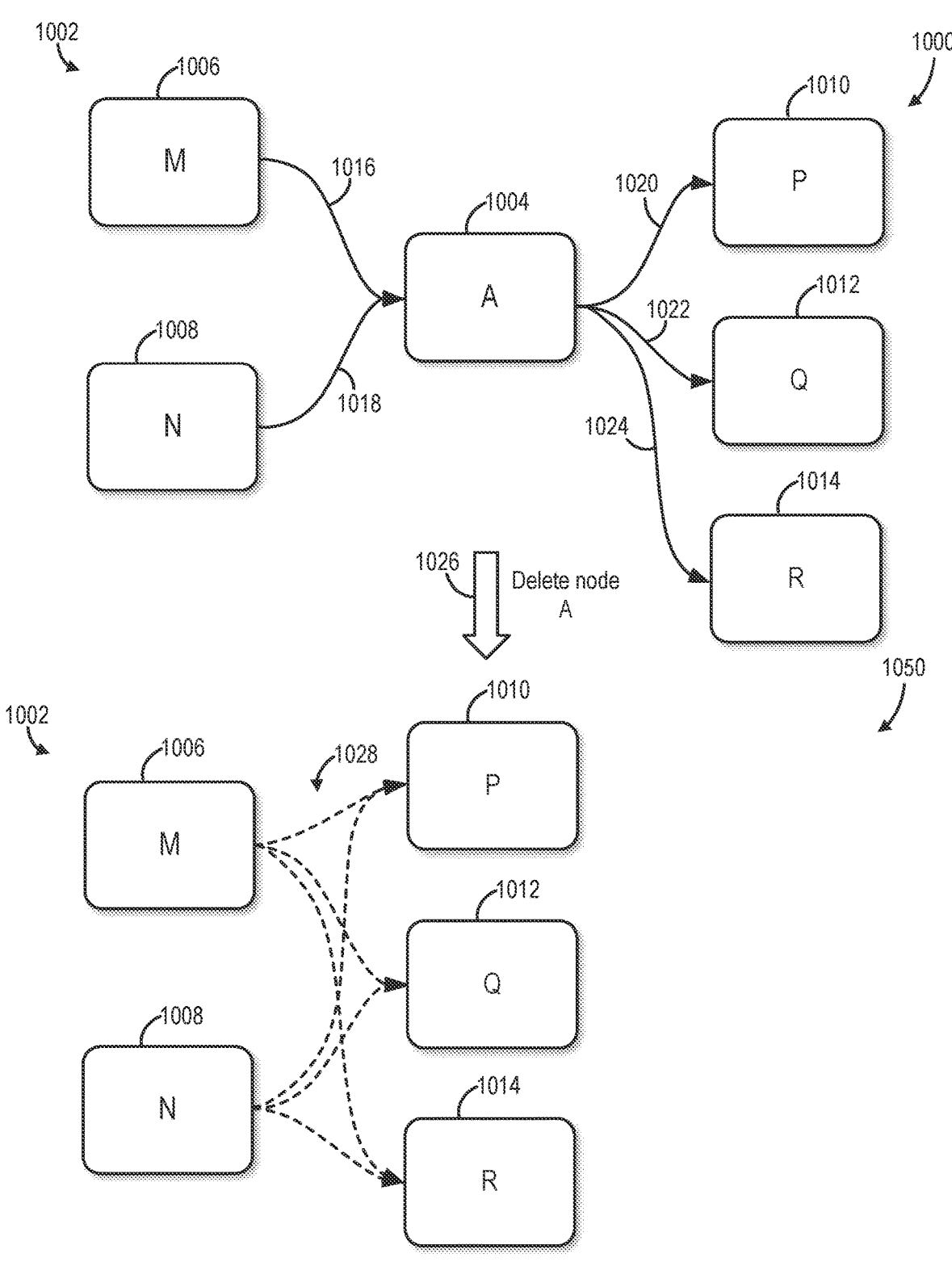
FIG. 10 illustrates a seventh example of modification to a directed graph, according to at least one embodiment.

A seventh example of a modification to a graph is illustrated in FIG. 10, in which a node is deleted and node deletion logic of one or more algorithms managing the digraph may be applied. An initial layout 1000 of a digraph 1002 is shown at an upper portion of FIG. 10, and a subsequent layout 1050 of the digraph 1002 is shown at a lower portion of FIG. 10. The initial layout 1000 of the digraph 1002 includes a first node 1004 (e.g., node A) with two incoming nodes and three outgoing nodes. The two incoming nodes to node A include a second node 1006 (e.g., node M) and a third node 1008 (e.g., node N) and the three outgoing nodes includes a fourth node 1010 (e.g., node P), a fifth node 1012 (e.g., node Q), and a sixth node 1014 (e.g., node R). Nodes M and N are connected to node A by a first directed edge 1016 and a second directed edge 1018, respectively, and node A is connected to nodes P, Q, and R by a third directed edge 1020, a fourth directed edge 1022, and a fifth directed edge 1024, respectively. The first and second directed edges 1016, 1018 may be outgoing edges of nodes M and N, respectively, and incoming edges of node A while the third, fourth, and fifth directed edges 1020, 1022, and 1024 may be outgoing edges of node A and incoming edges of nodes P, Q, and R, respectively. The incoming nodes to node A may be located in one or more layers precedent to a layer in which node A is disposed, and the layer of node A may be precedent to each of one or more layers that the outgoing nodes are located in.

Node A may be deleted (e.g., by a user), as indicated by arrow 1026 which may cause all of the incoming edges (e.g., the first and second directed edges 1016, 1018) and all of the outgoing edges (e.g., the third, fourth, and fifth directed edges 1020, 1022, and 1024) to be removed from the digraph 1002. Lists of the incoming nodes (e.g., nodes I and J) and the outgoing nodes (e.g., node P, Q, and R) may be created in response to the deletion of node A. As shown in the subsequent layout 1050, new connections, where the new connections may be hidden edges 1028, may be formed between the incoming nodes and the outgoing nodes. By inserting the hidden edges 1028, positions of the nodes and relationships between the nodes may be mapped and maintained without displaying multiple overlapping directed edges that may lead to obscuring of the directed edges result in a cluttered aesthetic.

In at least one embodiment, an algorithm of the digraph 1002 may include instructions to generate the hidden edges 1028 in response to deletion of a node if the deletion may result in reorganization of the digraph 1002 that appears cluttered. However, new directed edges may instead be inserted when the layout remains organized and easy to follow. For example, the instructions may include one or more commands to generate one or more directed edges (e.g., not hidden edges) when a node having only one incoming node is deleted, which allows the one incoming node to all the outgoing nodes of the deleted node. The instructions may also include one or more commands to generate one or more directed edges (e.g., not hidden edges) when a node having only one outgoing node is deleted, thereby connecting all incoming nodes of the deleted node to the one outgoing node (e.g., as depicted in FIG. 8). The instruction may also include one or more commands to generate one or more directed edges (e.g., not hidden edges) when a node that is deleted has two incoming nodes and two outgoing nodes (e.g., as depicted in FIG. 9). Furthermore, the instructions may also include one or more commands to generate one or more hidden edges when a node that is deleted has more than a threshold number of incoming nodes and/or more than a threshold number of outgoing nodes. For example, each threshold number may be two, or three, or any number between two and five. As an example, hidden edges may be inserted when a node is deleted that has more than 5 incoming nodes and/or more than 5 outgoing nodes.

In the subsequent layout 1050 of the digraph 1002, node I may be connected to each of nodes P, Q, and R, by the hidden edges 1028 and node J may be similarly connected to each of nodes P, Q, and R by the hidden edges 1028. The outgoing nodes may remain in the same one or more layers that were subsequent to the layer of node A in the initial layout 1000, or may be adjusted to the layer previously occupied by node A.

In at least one embodiment, an algorithm of a digraph may further include instructions, in addition to the instructions described above with reference to FIGS. 4-10, to determine whether a new connection, to be added in response to deletion of a node, is to be added as a hidden edge or a directed edge. The determination may be based on whether the deleted node previously had any hidden edges connected thereto. For example, if a deleted incoming edge or a deleted outgoing edge of the deleted node included a hidden edge, a new edge added to replace the deleted incoming edge or outgoing edge may also be a hidden edge.

Figure 11:
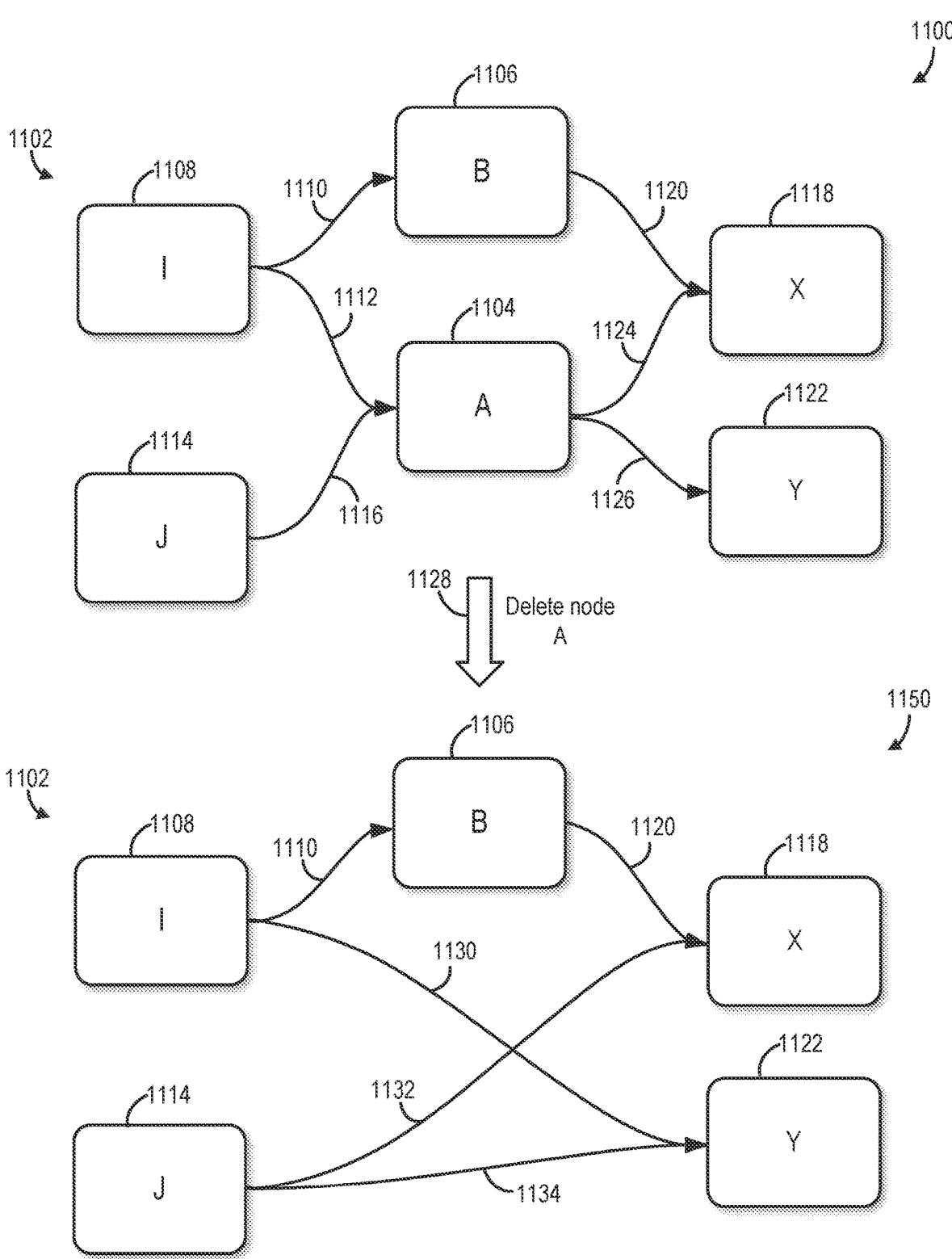
FIG. 11 illustrates an eighth example of modification to a directed graph, according to at least one embodiment.

An eighth example of a modification to a graph is illustrated in FIG. 11, in which a node is deleted and node deletion logic of one or more algorithms managing the digraph may be applied. An initial layout 1100 of a digraph 1102 is shown at an upper portion of FIG. 11, and a subsequent layout 1150 of the digraph 1102 is shown at a lower portion of FIG. 11. In the initial layout 1100, the digraph 1102 includes a first node 1104 (e.g., node A) and a second node 1106 (e.g., node B). Node B is connected to and depends from a third node 1108 (e.g., node I), as indicated by a first directed edge 1110, and node A is connected to and depends from each of node I, as indicated by a second directed edge 1112, and a fourth node 1114 (e.g., node J), as indicated by a third directed edge 1116. Node B is also connected to a fifth node 1118 (e.g., node X) by a fourth directed edge 1120 where node X is an outgoing node of node B. Node A is also connected to each of node X and a sixth node 1122 (e.g., node Y), by a fifth directed edge 1124 and a sixth directed edge 1126, respectively, where nodes X and Y are outgoing nodes of node A. Nodes I and J may be located in one or more layers of the digraph 1102 that are precedent to one or more layers that nodes A and B are located in, and the one or more layers of nodes A and B may be precedent to one or more layers that nodes X and Y are located in.

Node A may be deleted based on user input, as indicated by arrow 1128. The deletion of node A does not alter a chain of dependencies for node B. For instance, the first directed edge 1110 between node I and node A and the fourth directed edge 1120 between node A and node X may remained unchanged. New connections may be added to maintain dependencies between nodes I and J and nodes X and Y that previously included deleted node A. The new connections may include a seventh directed edge 1130 connecting node I to node Y, an eighth directed edge 1132 connecting node J to node X, and a ninth directed edge 1134 connecting node J to node Y. Further, the new connections may all be directed edges that are persisted to a database for the digraph 1102 as process data, and not hidden edges, because deleted node A had two incoming edges and two outgoing edges in the initial layout 1100 of the digraph 1102 (e.g., equal to or less than threshold numbers of incoming and outgoing edges).

Figure 12:
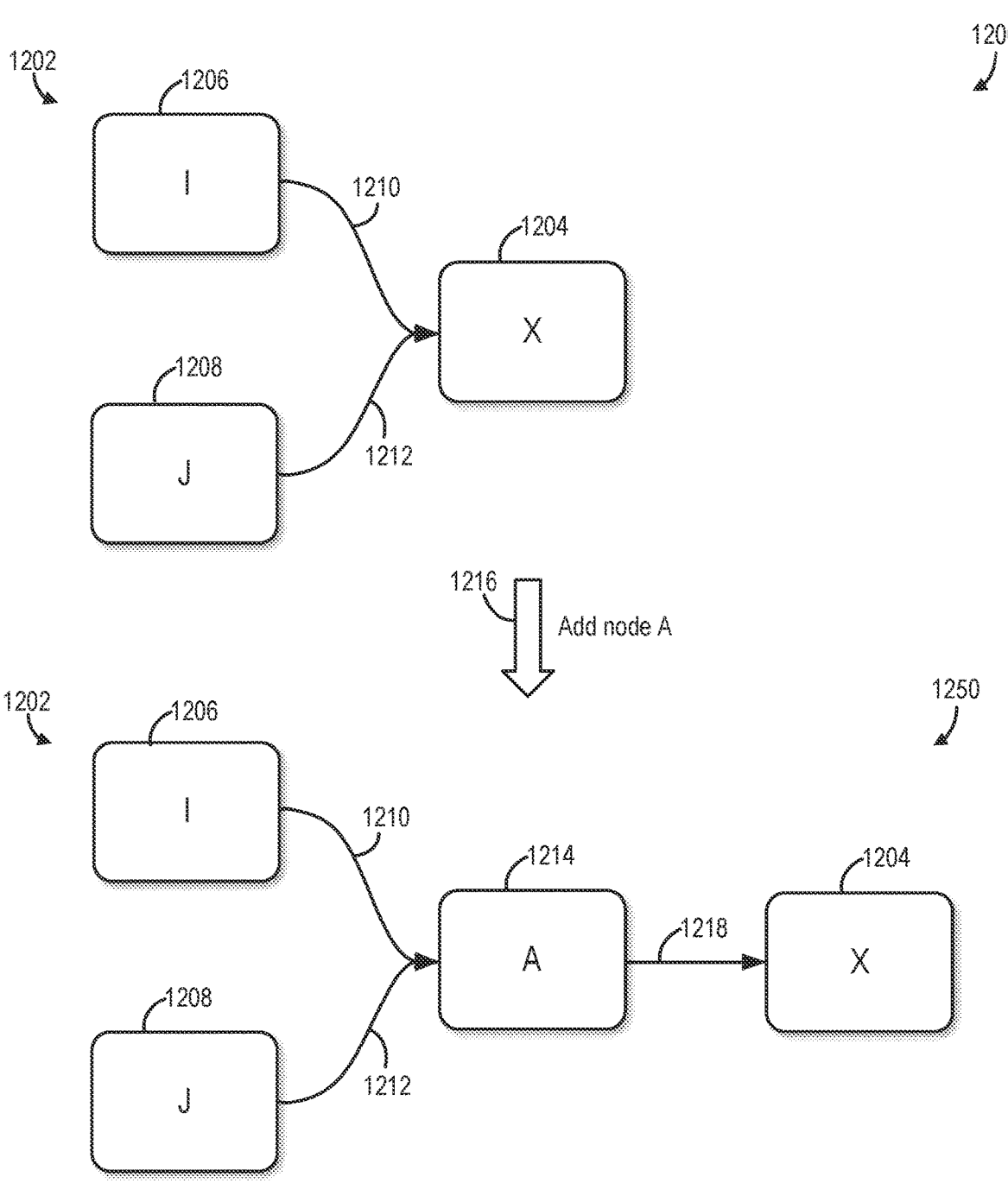
FIG. 12 illustrates a ninth example of modification to a directed graph, according to at least one embodiment.

A ninth example of a modification to a graph is illustrated in FIG. 12, in which a node is added and node addition logic of one or more algorithms managing the digraph may be applied. An initial layout 1200 of a digraph 1202 is shown at an upper portion of FIG. 12, and a subsequent layout 1250 of the digraph 1202 is shown at a lower portion of FIG. 12. In the initial layout 1200, the digraph 1202 includes a first node 1204 (e.g., node X) that depends from each of a second node 1206 (e.g., node I) and a third node 1208 (e.g., node J), as indicated by a first directed edge 1210 and a second directed edge 1212, respectively. The first directed edge 1210 is an outgoing edge of the second node 1206 and an incoming edge of the first node 1204 and the second directed edge 1212 is an outgoing edge of the third node 1208 and an incoming edge of the first node 1204. The second node 1206 and the third node 1208 may be located in one or more layers of the digraph 1202 that are precedent to a layer that the first node 1204 is positioned in.

A fourth node 1214 (e.g., node A) may be added based on input by a user, as indicated by arrow 1216, and inserted between node X and each of nodes I and J such that node X is an outgoing node of node A and nodes I and J are incoming nodes of node A. Upon addition of node A, all arrivals (e.g., endpoints) of incoming edges to node X may be re-routed from a left (e.g., incoming) side of node X to an incoming side of node A. For example, as shown in the subsequent layout 1250 of the digraph 1202, the first and second directed edges 1210 and 1212 are preserved in the digraph 1202 but become incoming edges of node A instead of node X. A new, third directed edge 1218 that is persisted to a database (e.g., to process data) of the digraph 1202 may be inserted to connect node A to node X, which may be an outgoing edge of node A and an incoming edge of node X. When inserted into the digraph 1202, node A may be added to the layer in which node X was located in the initial layout 1200 and node X may be shifted to a subsequent layer.

Figure 13:
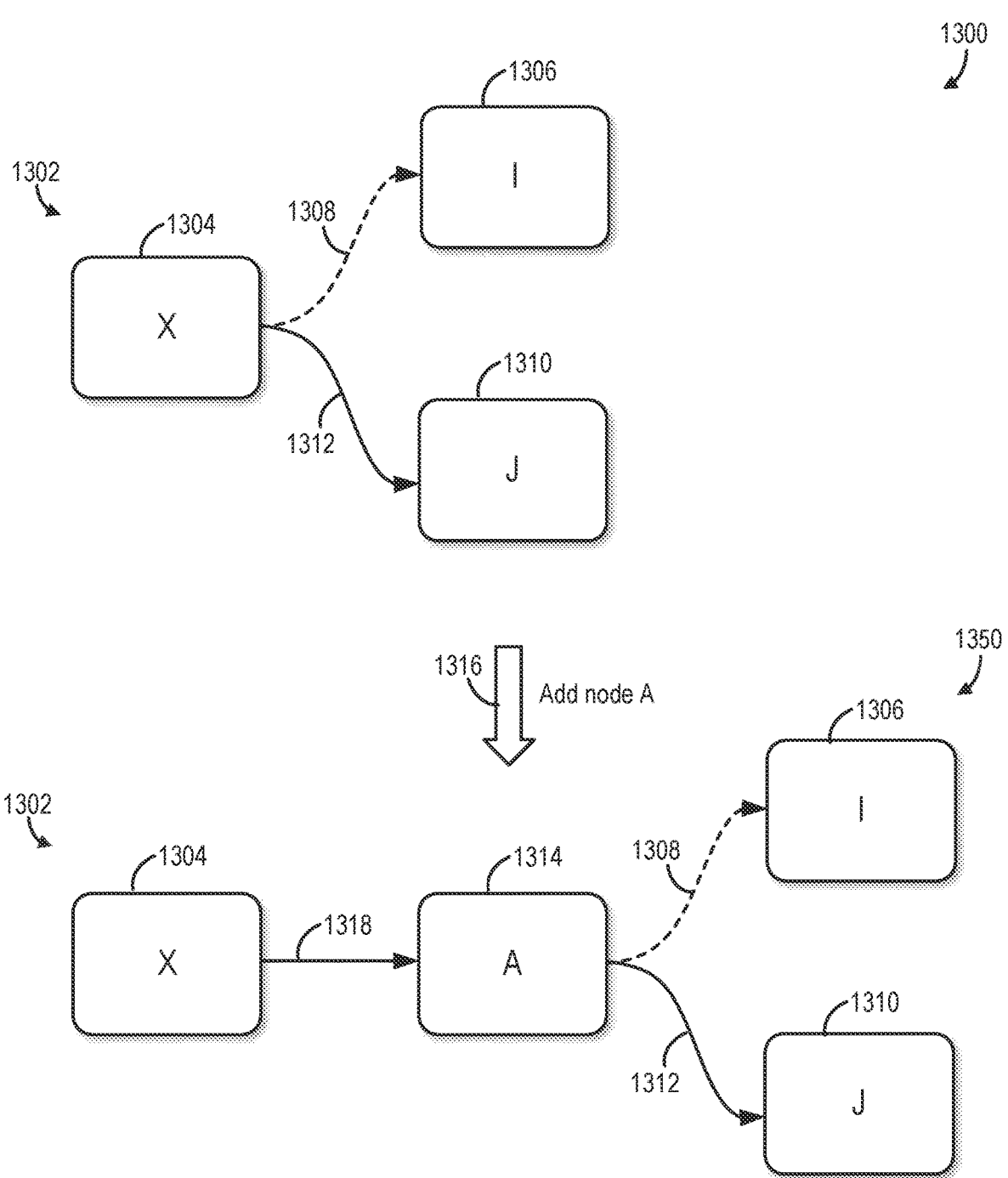
FIG. 13 illustrates a tenth example of modification to a directed graph, according to at least one embodiment.

A tenth example of a modification to a graph is illustrated in FIG. 13, in which a node is added and node addition logic of one or more algorithms managing the digraph may be applied. An initial layout 1300 of a digraph 1302 is shown at an upper portion of FIG. 13, and a subsequent layout 1350 of the digraph 1302 is shown at a lower portion of FIG. 13. In the initial layout 1300, a first node 1304 (e.g., node X) is connected to a second node 1306 (e.g., node I) by a hidden edge 1308 and to a third node 1310 by a first directed edge 1312. The hidden edge 1308 may be an outgoing edge of node X and an incoming edge of node I and the first directed edge 1312 may be an outgoing edge of node X and an incoming edge of node J. Node X may be in a layer of the digraph 1302 that is precedent to one or more layers that node I and node J are located in. The digraph 1302 may be in a temporary unavailable state due to the presence of the hidden edge 1308.

A fourth node 1314 (e.g., node A) may be added (e.g., by a user), as indicated by arrow 1316, and inserted between node X and each of nodes I and J. Upon addition of node A, all starting points of the incoming edges to node X may be re-routed from a right (e.g., outgoing) side of node X to an outgoing side of node A. For example, as shown in the subsequent layout 1350 of the digraph 1302, the hidden edge 1308 and the first directed edge 1312 are preserved in the digraph 1302 but become outgoing edges of node A instead of node X. A new, second directed edge 1318 that is persisted to process data of the digraph 1302 may be inserted to connect node A to node X, which may be an incoming edge of node A and an outgoing edge of node X. Node A may become a child node of node X. When inserted into the digraph 1302, node A may be added to the one of the one or more layers in which nodes I and J were located in the initial layout 1300 and one or more of nodes I and J may be shifted to a subsequent layer. The digraph 1302 may remain in a temporary unavailable state due to the presence of the hidden edge 1308.

Figure 14:
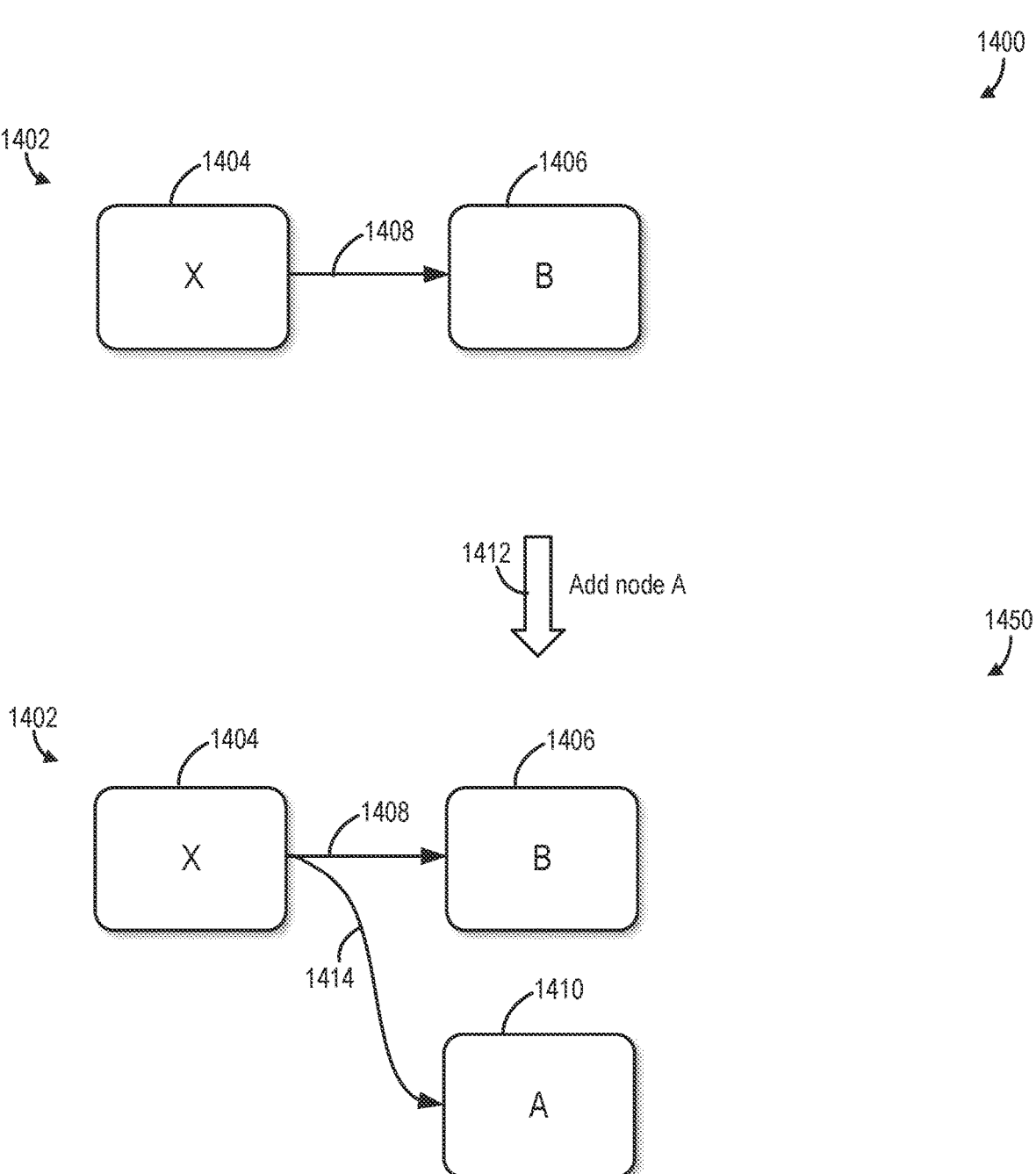
FIG. 14 illustrates an eleventh example of modification to a directed graph, according to at least one embodiment.

An eleventh example of a modification to a graph is illustrated in FIG. 14, in which a node is added and node addition logic of one or more algorithms managing the digraph may be applied. An initial layout 1400 of a digraph 1402 is shown at an upper portion of FIG. 14, and a subsequent layout 1450 of the digraph 1402 is shown at a lower portion of FIG. 14. In the initial layout 1400, a first node 1404 (e.g., node X) is connected to a second node 1406 (e.g., node B) by a first directed edge 1408. The first directed edge may be an outgoing edge of node X and an incoming edge of node B. Node X may be located in a layer of the digraph 1402 that is precedent to a layer that node B is located in.

A third node 1410 (e.g., node A) may be added to the digraph 1402 (e.g., by a user), as indicated by arrow 1412. For example, as shown in the subsequent layout 1450 of the digraph 1402, node A may be added to the digraph 1402 below node B, and to the same layer as node B in the digraph 1402. The one or more algorithms providing node addition logic may include instructions to only add a node as a node having connections to at least one existing node. A node, therefore, may not be added in isolation. As such, a second directed edge 1414 may added, as shown in the subsequent layout 1450 of the digraph 1402, connecting node X to node A. In other embodiments, where nodes are present in layers subsequent to an added node, the added node may instead be connected to an outgoing node rather than an incoming node, as depicted in FIG. 14. In yet other embodiments, an added node may be connected to more than one existing node in a digraph, based on dependencies between existing nodes.

Figure 15:
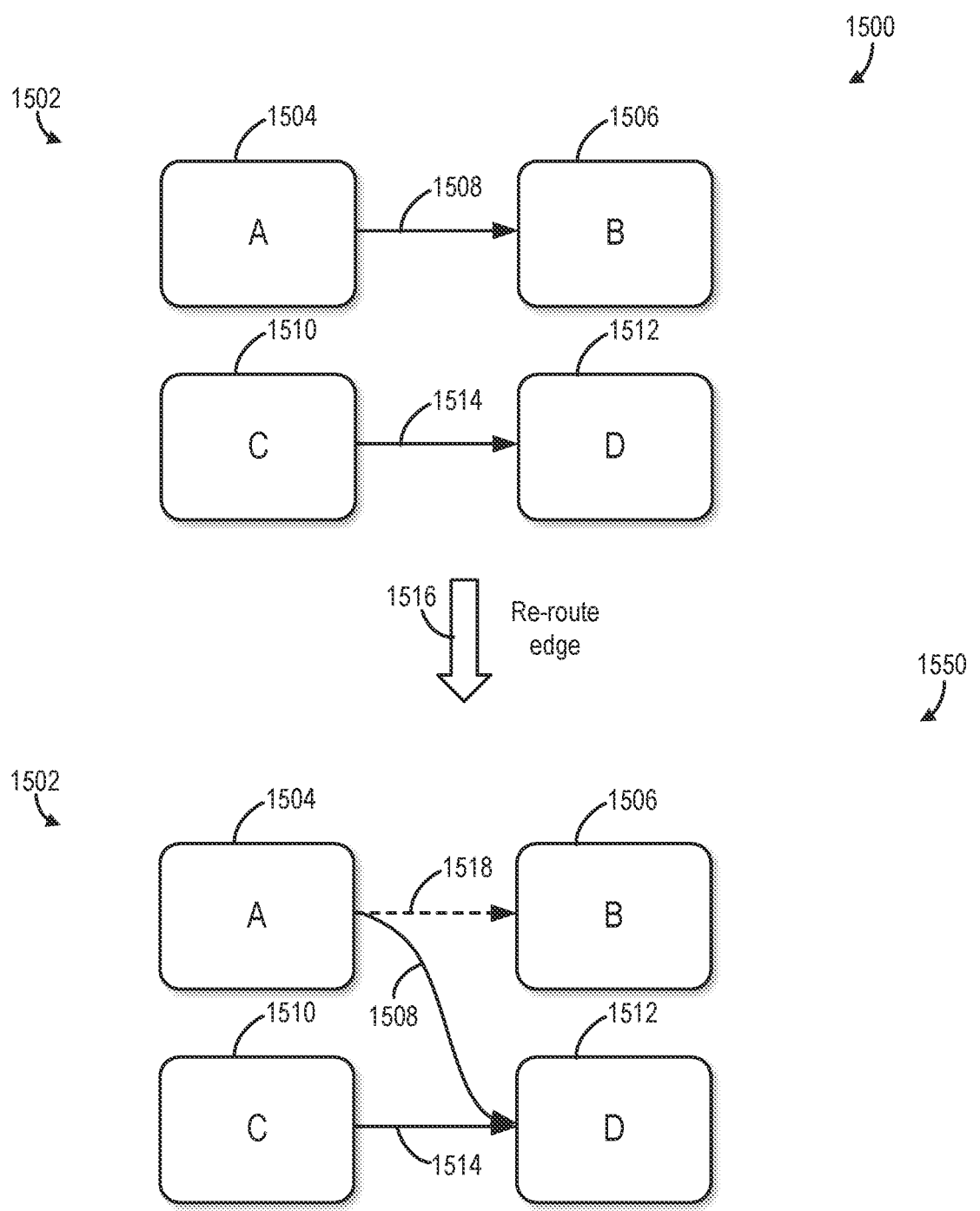
FIG. 15 illustrates a twelfth example of modification to a directed graph, according to at least one embodiment.

A twelfth example of a modification to a graph is illustrated in FIG. 15, in which a directed edge is re-routed and edge deletion and edge addition logic of one or more algorithms managing the digraph may be applied. An initial layout 1500 of a digraph 1502 is shown at an upper portion of FIG. 15, and a subsequent layout 1550 of the digraph 1502 is shown at a lower portion of FIG. 15. In the initial layout 1500, the digraph 1502 includes a first node 1504 (e.g., node A) connected to a second node 1506 (e.g., node B) by a first directed edge 1508, and a third node 1510 (e.g., node C) connected to a fourth node 1512 (e.g., node D) by a second directed edge 1514. The first directed edge 1508 may be outgoing edge of node A and an incoming edge of node B and the second directed edge 1514 may be outgoing edge of node C and an incoming edge of node D. Nodes A and C may be commonly located in a layer of the digraph 1502 that is precedent to a layer that nodes B and D are commonly located in.

At least one of the directed edges may be re-routed based on user input, as indicated by arrow 1516. Re-routing a directed edge may include shifting either a starting point or end point of the directed edge to a different node. For example, as shown in the subsequent layout 1550 of the digraph 1502, an end point of the first directed edge 1508 may be re-routed from node B to node D and the re-routing of the first directed edge 1508 may be persisted to process data of the digraph 1502. As the first directed edge 1508 was the only incoming edge to node B in the initial layout 1500 of the digraph 1502, a hidden edge 1518 may be inserted into the digraph 1502 between node A and node B to maintain a position of node B in the digraph 1502. The hidden edge 1518 is not persisted to the data but instead stored at a UI construct. The digraph 1502, in the subsequent layout 1550, may have a temporarily unavailable status due to a presence of the hidden edge 1518.

The edge addition, edge deletion, node addition, and node deletion logic described above and illustrated in FIGS. 4-15, may be included in one or more algorithms used to manage modifications to a digraph. It will be appreciated that the modifications depicted in FIG. 4-15 are non-limiting examples and numerous scenarios in addition to those shown are possible for adding and deleting edges and nodes are possible. The algorithm logic discussed above may be similarly applicable to additional digraph modifications not described herein.

Furthermore, the one or more algorithms may include instructions to generate a list of declarative commands when one or more nodes and/or one or more edges of a digraph are modified. The list of commands may be sent to an underlying digraph tool, e.g., software for generating the digraph, as an atomic unit (e.g., isolated from other operations) and the commands may be carried out as a single update to the digraph that includes all commanded modifications.

Figure 16:
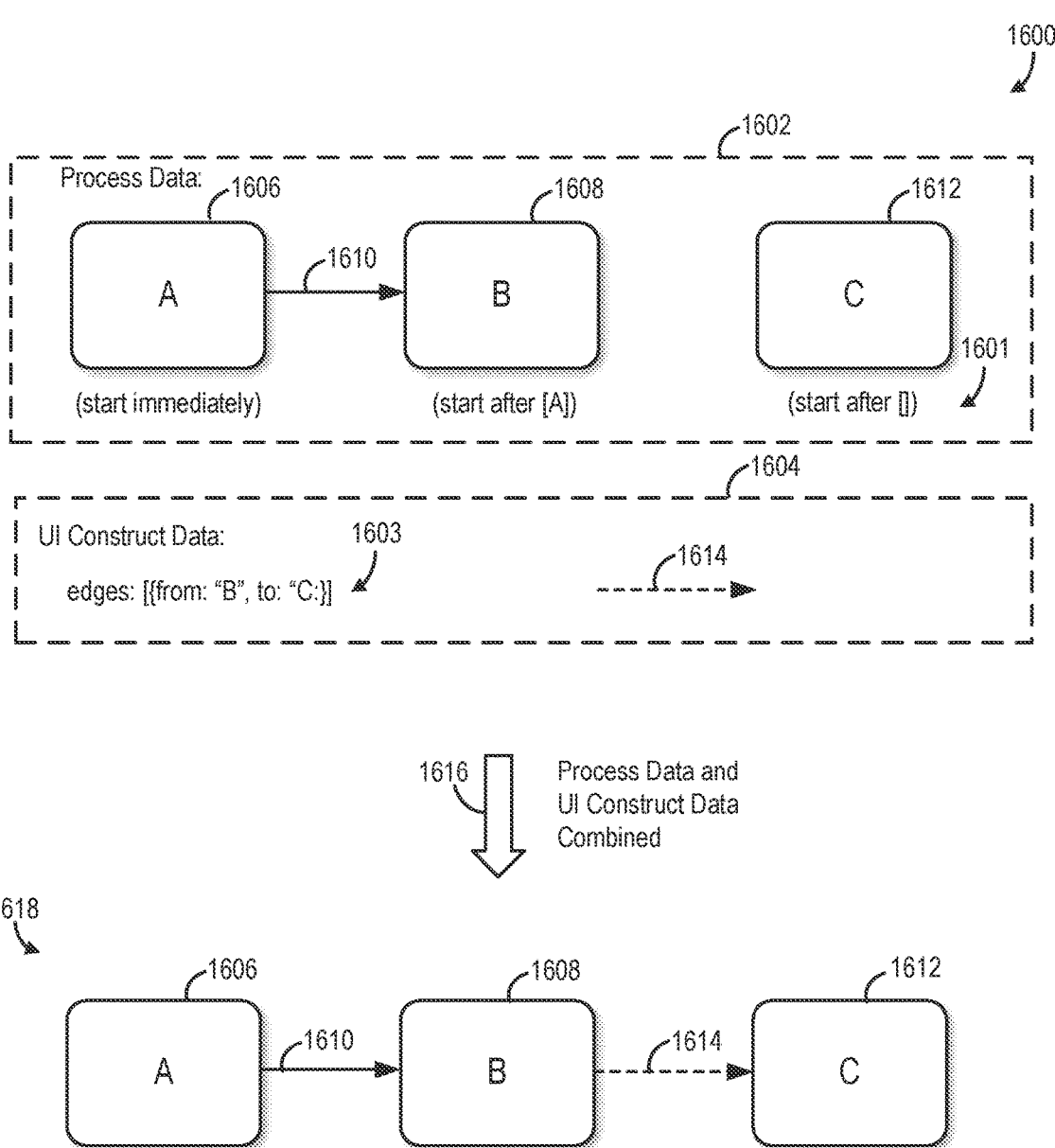
FIG. 16 illustrates an example of construction of a digraph, according to at least one embodiment.

As discussed above, a digraph tool may include a database storing process data of a digraph. The process data may include code corresponding to existing nodes and directed edges of the digraph and modifications to the nodes and directed edges may be persisted to the database to update the process data accordingly. In instances where a hidden edge is generated and inserted into the digraph, the hidden edge may be implemented as an invisible graphical user element, such as a data structure of a UI construct that is stored separate from the process data. The digraph may therefore include a combination of the process data and the UI construct. Combining of the process data with the UI construct data is illustrated in an exemplary digraph construction 1600 in FIG. 16.

The digraph construction 1600 may represent a state of a digraph upon modification of the digraph by a user and shows a first underlying process 1602 for a digraph tool and a second underlying process 1604 for a UI construct. The first underlying process 1602 may utilize process data of the digraph tool and the second underlying process 1604 may utilize data stored as the UI construct. In at least one embodiment, the process data may include information 1601 regarding a first node 1606 (e.g., node A) connected to a second node 1608 (e.g., node B) by a directed edge 1610. The process data may further include data for a third node 1612 (e.g., node C) which may be isolated, having no incoming edges or outgoing edges. For example, the user may have deleted a directed edge connecting node C to node B and the digraph may be in an invalid state as a result.

The user interface construct data may include data for a directed edge 1614 that is generated and inserted based on edge deletion logic 1603, as described above with reference to FIGS. 4 and 5, to maintain a position of node C in the digraph. A command list generated based on the process data and the UI construct data may be sent to the digraph tool as indicated by arrow 1616, to produce an updated status 1618 of the digraph with the hidden edge 1614 added to replace the deleted directed edge between node B and node C.

In this way, a digraph may be readily modified without undesired rearrangement and/or collapse of process flows depicted therein by utilizing logic (e.g., software algorithms) described above with reference to FIGS. 4-16. For example, by inserting hidden edges, node positions may be temporarily preserved. Preservation of the digraph structure, despite causing the digraph to be in a temporarily unavailable state, may allow a user to make further modifications to the digraph to adjust the digraph to an available state without encountering unintentional reorganization of the graph that may obscure relationships between nodes. Further, the logic for managing modifications to the digraph described herein may be used with already existing digraph algorithms, thereby mitigating rewriting of the digraph algorithms.

Figure 17:
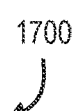
FIG. 17 illustrates an example of a process for managing modifications to a digraph, according to at least one embodiment.

FIG. 17 illustrates an example process 1700 in which invisible graphical user elements, implemented as hidden edges, may be used in conjunction with process data for managing a digraph. The process data may be stored at a digraph database, in accordance with at least one embodiment. In at least one embodiment, a computing system comprising one or more computing devices, such as the computing system 1800 of FIG. 18, performs one or more steps 1702-1716 in process 1700 using the one or more computing devices. In at least one embodiment, at least one of the one or more computing devices may include one or more processors configured with executable instructions to perform the steps of process 1700.

In at least one embodiment, logic of the user interface construct for managing modifications to the digraph and for integration of the logic of the user interface construct into the algorithms for generating and managing the digraph structure may include any combination of the logic described above with reference to FIGS. 4-16. In at least one embodiment, the user interface construct instructions may include all logic illustrated at FIGS. 4-16. For example, the logic may include instructions for handling one or more of deletion and/or addition of directed edges, deletion and/or addition of nodes, as well as adjustments to how the directed edges are connected to the nodes.

In at least one embodiment, step 1702 of process 1700 may include receiving an indication that a modification is made to the digraph. For instance, a digraph tool configured with instructions to monitor modifications to the process data of the digraph may generate an alert that deletion of one or more incoming edges to one or more nodes is detected. Confirmation may be requested, at step 1704, for whether a node is isolated due to the modification and if one or more hidden edges are to be generated in response to isolation of the node. Generation of a hidden edge (such as any of the hidden edges as described above with respect to FIG. 3, 4, 10, 15, or 16) may be demanded if certain conditions are met. As an example, generation of the hidden edge may be required to preserve positions of the nodes in the digraph when all incoming edges to a node are deleted. As another example, generation of the one or more hidden edges may be desirable when a node is deleted that has more than a threshold number of incoming edges and/or more than a threshold number of outgoing edges, as described previously. By generating the hidden edge, a layout of the digraph may be maintained and relative positionings of the nodes may be preserved such that an original flow of the digraph remains evident.

If a node is not isolated and the conditions are not met for generating a hidden edge, process 1700 may include proceeding to step 1706 where the modification of the digraph may be persisted to the process data without generating a hidden edge. In at least some embodiments, even if generation of a hidden edge is not demanded, logic of the user interface construct may still be applied. For examples, as illustrated by FIGS. 5-9 and 10-14 and described above, the user interface construct logic may include instructions for maintaining the process flows and structure of the digraph in instances where one or more of addition and deletion of nodes, addition of directed edges, and shifting of directed edge origins and/or arrivals occur. The logic may be similarly applied when modification of the digraph is detected by the digraph tool.

If the conditions are met, however, process 1700 may continue to step 1708 which may include inserting one or more hidden edges into the digraph. In at least one embodiment, inserting the one or more hidden edges may include generating an invisible graphical user element, such as a data structure that is not visually displayed at the digraph but recognized by the digraph algorithms as being a connection between the nodes that were previously connected by the deleted directed edge. Relative positions of the nodes are thereby maintained in the digraph upon modification of the digraph.

By generating the hidden edge as an invisible graphical user element, the modification made to the digraph may be visible, e.g., to a user, without causing the hidden edge to be persisted to process data of the digraph. As such, the process data does not deviate from data desired by the user to be persisted to the digraph database. For example, the hidden edge may be a temporary structure that is readily inserted into and removed from the digraph without affecting the process data. As a result, generation and removal of the hidden edge may impose a low burden on computing resources and may be performed quickly.

At step 1710, process 1700 may include providing a notification that the digraph is in an unavailable state due to the presence of the one or more hidden structures in the digraph. When in the unavailable state, further actions for processing the digraph, such as rendering or publishing the digraph, may be blocked until the digraph is no longer in the unavailable state. The notification may be, for example, a message displayed at a user interface or display interface displaying the digraph indicating a status of the digraph. In at least one embodiment, the notification may include a prompt to provide suitable further modifications to the digraph in order to proceed with further processing of the digraph.

At step 1712, process 1700 may include confirming if the digraph has been further modified to be in an available state. In one example, modifying the digraph to adjust the digraph to the available state may include adding one or more directed edges to the digraph to allow all hidden edges to be removed, as shown in FIGS. 6 and 7. In at least one embodiment, the directed edge may be added such that the process flows and structure of the digraph may be maintained according to the process flows and structure of the digraph prior to generation of the hidden edge.

If the digraph is not adjusted to the available state, process 1700 may continue to step 1714 which may include maintaining the digraph in its current state. For example, the data structure corresponding to the hidden edge may remain inserted in the digraph such that the hidden edge remains therein. Process 1700 may then include returning to step 1712 to again confirm if the digraph has been further modified. If, at step 1712, the digraph is confirmed to be adjusted to the available state, process 1700 may proceed to step 1716 which may include removing the hidden edge from the digraph.

Figure 18:
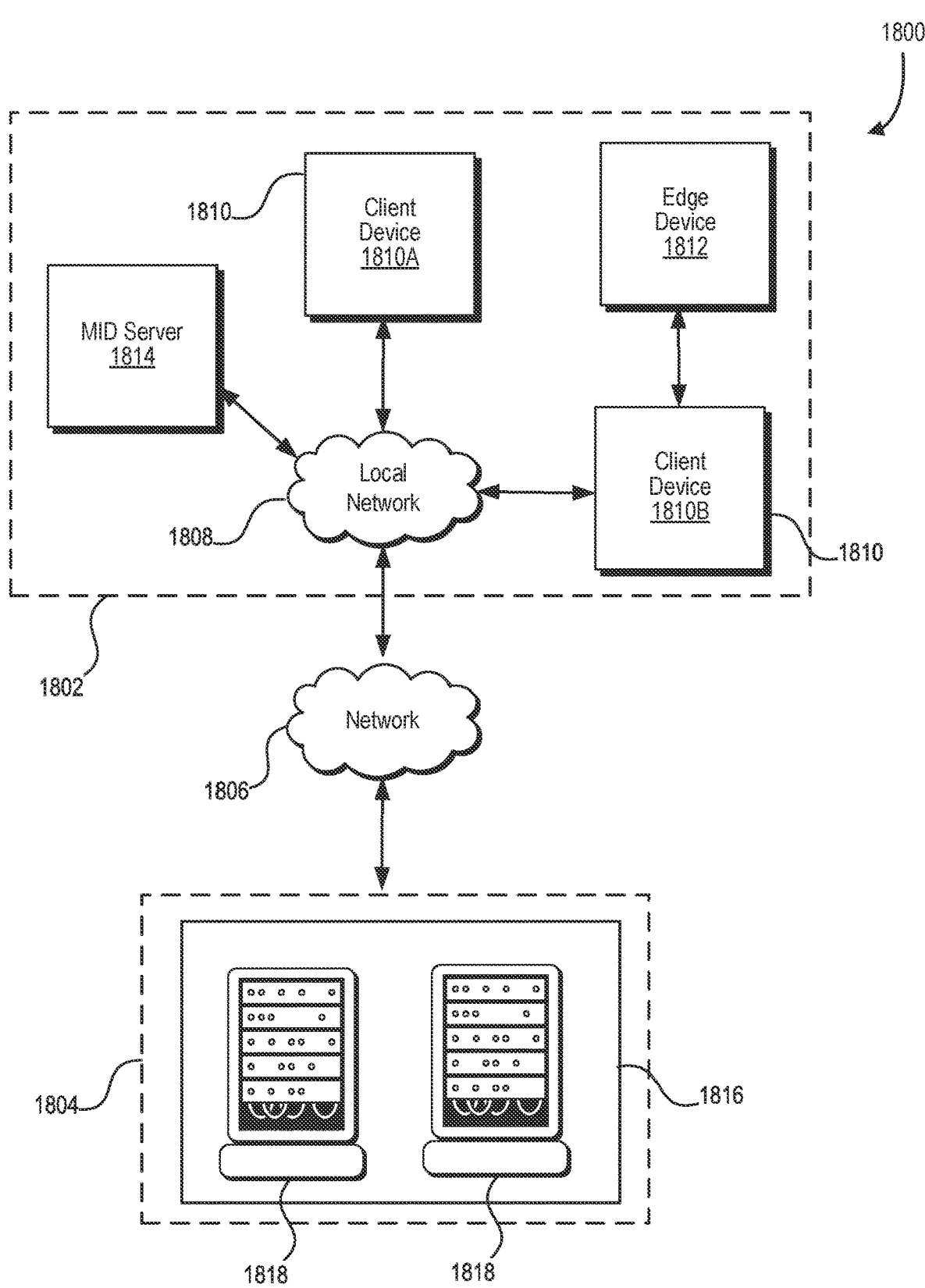
FIG. 18 illustrates a system in which various embodiments can be implemented.

In at least one embodiment, a processor performs one or more steps 1702-1716 in process 1700 using one or more systems described in FIG. 18 (e.g., see elements 1804, 1810, 1812, 1814, 1816 and 1818 in FIG. 18). In at least one embodiment, one or more steps in process 1700 are otherwise combined, performed in series, and/or performed in parallel. In at least one embodiment, some or all of process 1700 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 1700 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 1700 is performed at least in part on a computer system such as those described elsewhere in this disclosure. In at least one embodiment, logic (e.g., hardware, software, or a combination of hardware and software) performs process 1700.

FIG. 18 illustrates a system 1800 in which various embodiments can be implemented. The computing system 1800 may include a client network 1802 and a provider platform 1804 that are operably connected via a network 1806 (e.g., the Internet). In an embodiment, the client network 1802 may be a private local network 1808, such as a local area network (LAN) that includes a variety of network devices that include, but are not limited to, switches, servers, and routers. In an embodiment, the client network 1802 can comprise an enterprise network that can include one or more LANs, virtual networks, data centers, and/or other remote networks. In an embodiment, the client network 1802 can be operably connected to one or more client devices 1810 such as example client device 1810A, 1810B so that the client devices 1810 are able to communicate with each other and/or with the provider platform 1804. In at least one embodiment, a digraph may be displayed at one or more of the client devices 1810, which may be generated and modified using the client devices 1810. Moreover, in at least one embodiment, the client devices 1810 may be configured with algorithms for generating an invisible graphical user element to be used in conjunction with algorithms for managing the digraph. The invisible graphical user element, which may include a data structure for a hidden edge, may be stored locally at the client devices 1810.

In an embodiment, the client devices 1810 can be computing systems and/or other types of computing devices generally referred to as Internet of Things (IoT) devices that can access cloud computing services, for example, via a web browser application or via an edge device 1812 that may act as a gateway between one or more client devices 1810 and the platform 1804 (e.g., second client device 1810B). In an embodiment, the client network 1802 can include a management, instrumentation, and discovery (MID) server 1814 that facilitates communication of data between the network hosting the platform 1804, other external applications, data sources, and services, and the client network 1802. In an embodiment, the client network 1802 may also include a connecting network device (e.g., a gateway or router) or a combination of devices that implement a customer firewall or intrusion protection system.

In an embodiment, the client network 1802 can be operably coupled to the network 1806, which may include one or more suitable computing networks, such as a large area network (LAN), wide area networks (WAN), the Internet, and/or other remote networks, that are operable to transfer data between the client devices 1810 and the provider platform 1804. In an embodiment, one or more computing networks within network 1806 can comprise wired and/or wireless programmable devices that operate in the electrical and/or optical domain. For example, network 1806 may include wireless networks, such as cellular networks (e.g., Global System for Mobile Communications (GSM) based cellular network), WIN networks, and/or other suitable radio-based networks. The network 1806 may also employ any suitable network communication protocols, such as Transmission Control Protocol (TCP), Internet Protocol (IP), and the like. In an embodiment, network 1806 may include a variety of network devices, such as servers, routers, network switches, and/or other suitable network hardware devices configured to transport data over the network 1806.

In an embodiment, the provider platform 1804 may be a remote network (e.g., a cloud network) that is able to communicate with the client devices 1810 via the client network 1802 and network 1806. In an embodiment, the provider platform 1804 can comprise a configuration management database (CMDB) platform. In an embodiment, the provider platform 1804 provides additional computing resources to the client devices 1810 and/or the client network 1802. For example, by utilizing the provider platform 1804, in some examples, users of the client devices 1810 are able to build and execute applications for various enterprise, IT, and/or other organization-related functions. In one embodiment, the provider platform 1804 can be implemented on the one or more data centers 1816, where each data center 1816 can correspond to a different geographic location in some examples. In an embodiment, one or more of the data centers 1816 includes a plurality of servers 1818 (also referred to in some examples as application nodes, virtual servers, application servers, virtual server instances, application instances, application server instances, or the like), where each server 1818 can be implemented on a physical computing system, such as a single electronic computing device (e.g., a single physical hardware server) or across multiple-computing devices (e.g., multiple physical hardware servers). Examples of servers 1818 can include a virtual server, a web server (e.g., a unitary Apache installation), an application server (e.g., a unitary Java Virtual Computer), and/or a database server.

In at least one embodiment, one or more databases may be included at one or more of the servers 1818, where the database may store process data for the digraph. For example, the process data may be information regarding how the digraph is to be displayed, including how nodes of the digraph are connected. Modifications to the digraph may be persisted to the database, such as addition and deletion of the nodes, addition and deletion of directed edges, etc. The database may further store rules for how the digraph is to be structured and displayed. The process data stored at the database may be used in combination with the user interface construct, the user interface construct stored at one or more of the client devices 1810, to manage display and modification of the digraph.

To utilize computing resources within the provider platform 1804, in an embodiment, network operators may choose to configure the data centers 1816 using a variety of computing infrastructures. In an embodiment, one or more of the data centers 1816 can be configured using a multi-instance cloud architecture to provide every customer with its own unique customer instance or instances. For example, a multi-instance cloud architecture of some embodiments can provide each customer instance with its own dedicated application server and dedicated database server. In some examples, the multi-instance cloud architecture could deploy a single physical or virtual server 1818 and/or other combinations of physical and/or virtual servers 1818, such as one or more dedicated web servers, one or more dedicated application servers, and one or more database servers, for each customer instance. In an embodiment of a multi-instance cloud architecture, multiple customer instances can be installed on one or more respective hardware servers, where each customer instance is allocated certain portions of the physical server resources, such as computing memory, storage, and processing power. By doing so, in some examples each customer instance has its own unique software stack that provides the benefit of data isolation, relatively less downtime for customers to access the platform 1804, and customer-driven upgrade schedules.

In some embodiments, the provider platform 1804 includes a computer-generated data management server that receives, via network 1806 and/or an internal network within or across different data centers, computer-generated data for storage and analysis. For example, log entries can be sent from client devices/servers 1810, MID server 1814 (e.g., agent server acting as the intermediary in client network 1802 to facilitate access to client network 1802 by the network hosting the platform 1804), and/or servers in data centers 1816 to a log management server in data centers 1816.

Although FIG. 18 illustrates a specific embodiment of a cloud computing system 1800, the disclosure is not limited to the specific embodiments illustrated in FIG. 18. For instance, although FIG. 18 illustrates that the platform 1804 is implemented using data centers, other embodiments of the platform 1804 are not limited to data centers and can utilize other types of remote network infrastructures. Some embodiments may combine one or more different virtual servers into a single virtual server. The use and discussion of FIG. 18 are only examples to facilitate ease of description and explanation and are not intended to limit the disclosure to the specific examples illustrated therein. In an embodiment, the respective architectures and frameworks discussed with respect to FIG. 18 can incorporate suitable computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Embodiments of the disclosure can be described in view of the following: A system and method of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The method includes obtaining a graph which may include: a plurality of nodes; and a plurality of edges, where each node of the plurality of nodes is interconnected to at least one other node from the plurality of nodes via a respective edge of the plurality of edges, and where each edge of the plurality of edges may include a respective starting point at a respective start node and a respective end point at a respective end node. The method also includes receiving, via a user interface, an input indicating an edit to the graph. The method also includes, in response to receiving the edit: modifying, based on the edit, the graph; and determining that modifying the graph based on the edit causes a particular node of the graph to be isolated. In response to determining that modifying the graph based on the edit causes the particular node of the graph to be isolated, the method may further include generating a hidden edge which may include an invisible graphical user element to connect the particular node of the graph to at least one other node of the plurality of nodes of the graph. Other embodiments of this aspect include corresponding computer systems, apparatus, and computer programs recorded on one or more computer storage devices, each configured to perform the actions of the methods.

Implementations may include one or more of the following features. The edit may include causing edges having an end point at the particular node to be deleted. Generating the hidden edge may include inserting the invisible graphical user element between a node of the plurality of nodes precedent to the particular node and the particular node. The hidden edge may include a data structure that is maintained in a display of the graph. Generating the hidden edge may include storing the invisible graphical user element separate from process data of the graph. Generating the hidden edge may also include maintaining a position of the particular node in the graph unchanged relative to the position of the particular node prior to receiving the input indicating the edit. The method may further include: determining that modifying the graph according to the input indicating the edit does not cause the particular node of the graph to be isolated; and maintaining, based on the determination, a layout of the graph without generating the hidden edge. Implementations of the described techniques may include hardware, a method or process, or computer software on a computer-accessible medium.

One general aspect includes a system. The system also includes one or more processors. The system also includes memory, including computer-executable instructions that, if executed by the one or more processors, cause the system to: obtain a graph, which may include: a plurality of nodes; and a plurality of edges, where each node of the plurality of nodes is interconnected to at least one other node from the plurality of nodes via a respective edge of the plurality of edges, and where each edge of the plurality of edges may include a respective starting point at a respective start node and a respective end point at a respective end node; receive, via a user interface, an input indicating an edit to the graph; in response to receiving the edit: modify, based on the edit, the graph; and determine that modifying the graph based on the edit causes a particular node of the graph to be isolated. The instructions may further cause the one or more processor to, in response to determining that modifying the graph based on the edit causes the particular node of the graph to be isolated: generate a hidden edge which may include an invisible graphical user element to connect the particular node of the graph to at least one other node of the plurality of nodes of the graph. Other embodiments of this aspect include corresponding computer systems, apparatus, and computer programs recorded on one or more computer storage devices, each configured to perform the actions of the methods.

Implementations may include one or more of the following features. The system further includes computer-executable instructions to remove the hidden edge from the graph in response to receiving a subsequent input indicating a subsequent edit to the graph, where the subsequent edit to the graph may include addition of a new edge to the particular node. The new edge may have a respective end point at the particular node and a respective start point at a node of the plurality of nodes that precedes the particular node in the graph. The edit may include deletion of a node of the plurality of nodes, the node may include greater than a threshold number of incoming nodes and/or greater than a threshold number of outgoing nodes, and one or more additional hidden edges may be generated in response to the deletion of the node. The graph may be used to depict process flows for project management, where the plurality of nodes may be one or more of tasks, activities, and entities, and the plurality of edges may be directed edges indicating dependencies between the plurality of nodes. The edit may include shifting of an end point of an edge from the particular node to an incoming node of the plurality of nodes, the edge being an only incoming edge to the particular node, and where the hidden edge is inserted between the incoming node and the particular node. Implementations of the described techniques may include hardware, a method or process, or computer software on a computer-accessible medium.

One general aspect includes a non-transitory computer-readable storage medium having stored thereon executable instructions which may obtain a graph including: a plurality of nodes; and a plurality of edges, where each node of the plurality of nodes is interconnected to at least one other node from the plurality of nodes via a respective edge of the plurality of edges, and where each edge of the plurality of edges may include a respective starting point at a respective start node and a respective end point at a respective end node. The medium may also receive, via a user interface, an input indicating an edit to the graph. The medium may also, in response to receiving the edit: modify, based on the edit, the graph; and determine that modifying the graph based on the edit causes a particular node of the graph to be isolated. The medium may also, in response to determining that modifying the graph based on the edit causes the particular node of the graph to be isolated: generate a hidden edge which may include an invisible graphical user element to connect the particular node of the graph to at least one other node of the plurality of nodes of the graph. Other embodiments of this aspect include corresponding computer systems, apparatus, and computer programs recorded on one or more computer storage devices, each configured to perform the actions of the methods.

Implementations may include one or more of the following features. The non-transitory computer-readable storage medium may further include executable instructions to store hidden edge as a data structure used for user interface specific data. The hidden edge may not be persisted to process data of the graph. The graph may be in a temporarily unavailable state when the hidden edge is generated. The graph may adjust from a temporary unavailable state to an available state when the hidden edge is removed from the graph. The hidden edge may be removed from the graph when a new edge is added to the graph, the new edge including an end point at the particular node. The graph may be a digraph and the plurality of edges may be directed edges. Implementations of the described techniques may include hardware, a method or process, or computer software on a computer-accessible medium.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the resent disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A method comprising:
obtaining a directed graph comprising:
    a plurality of nodes; and
    a plurality of edges, wherein each node of the plurality of nodes is interconnected to at least one other node from the plurality of nodes via a respective edge of the plurality of edges, and wherein each edge of the plurality of edges comprises a respective starting point at a respective start node and a respective end point at a respective end node;
receiving, via a user interface, an input indicating an edit to the directed graph;
in response to receiving the edit:
    modifying, based on the edit, the directed graph; and
    determining that modifying the directed graph based on the edit causes a particular node of the directed graph to be isolated; and
in response to determining that modifying the directed graph based on the edit causes the particular node of the directed graph to be isolated:
    generating a hidden edge comprising an invisible graphical user element to connect the particular node of the directed graph to at least one other node of the plurality of nodes of the directed graph, wherein the invisible graphical user element comprises a data structure that is not visually displayed on the directed graph but recognized as being a connection between respective nodes of the plurality of nodes to act as a placeholder.

2. The method of claim 1, wherein the edit comprises causing edges having an end point at the particular node to be deleted.

3. The method of claim 1, wherein generating the hidden edge comprises inserting the invisible graphical user element between a node of the plurality of nodes precedent to the particular node and the particular node.

4. The method of claim 1, wherein the hidden edge comprises a data structure that is maintained in a display of the directed graph.

5. The method of claim 1, wherein generating the hidden edge includes storing the invisible graphical user element separate from process data of the directed graph.

6. The method of claim 1, wherein generating the hidden edge includes maintaining a position of the particular node in the directed graph unchanged relative to the position of the particular node prior to receiving the input indicating the edit.

7. The method of claim 1, further comprising:
determining that modifying the directed graph according to the input indicating the edit does not cause the particular node of the directed graph to be isolated; and
maintaining, based on the determination, a layout of the directed graph without generating the hidden edge.

8. A system, comprising:
one or more processors; and
memory, including computer-executable instructions that, if executed by the one or more processor, cause the system to:
    obtain a directed graph comprising:
        a plurality of nodes; and
        a plurality of edges, wherein each node of the plurality of nodes is interconnected to at least one other node from the plurality of nodes via a respective edge of the plurality of edges, and wherein each edge of the plurality of edges comprises a respective starting point at a respective start node and a respective end point at a respective end node;
    receive, via a user interface, an input indicating an edit to the directed graph;
    in response to receiving the edit:
        modify, based on the edit, the directed graph; and
        determine that modifying the directed graph based on the edit causes a particular node of the directed graph to be isolated; and
    in response to determining that modifying the directed graph based on the edit causes the particular node of the directed graph to be isolated:
        generate a hidden edge comprising an invisible graphical user element to connect the particular node of the directed graph to at least one other node of the plurality of nodes of the directed graph, wherein the invisible graphical user element comprises a data structure that is not visually displayed on the directed graph but recognized as being a connection between respective nodes of the plurality of nodes to act as a placeholder.

9. The system of claim 8, wherein the hidden edge is removed from the directed graph in response to receiving a subsequent input indicating a subsequent edit to the directed graph, and wherein the subsequent edit to the directed graph comprises addition of a new edge to the particular node.

10. The system of claim 9, wherein the new edge has a respective end point at the particular node and a respective start point at a node of the plurality of nodes that precedes the particular node in the directed graph.

11. The system of claim 8, wherein the edit includes deletion of a node of the plurality of nodes, the node comprising greater than a threshold number of incoming nodes and/or greater than a threshold number of outgoing nodes, and wherein one or more additional hidden edges are to be generated in response to the deletion of the node.

12. The system of claim 8, wherein the directed graph is used to depict process flows for project management, and wherein the plurality of nodes are one or more of tasks, activities, and entities, and the plurality of edges are directed edges indicated dependencies between the plurality of nodes.

13. The system of claim 8, wherein the edit includes shifting of an end point of an edge from the particular node to an incoming node of the plurality of nodes, the edge being an only incoming edge to the particular node, and wherein the hidden edge is inserted between the incoming node and the particular node.

14. A non-transitory computer-readable storage medium having stored thereon executable instructions which, when executed by one or more processor of a computer system, cause the computer system to:

obtain a directed graph comprising:

a plurality of nodes; and a plurality of edges, wherein each node of the plurality of nodes is interconnected to at least one other node from the plurality of nodes via a respective edge of the plurality of edges, and wherein each edge of the plurality of edges comprises a respective starting point at a respective start node and a respective end point at a respective end node;

receive, via a user interface, an input indicating an edit to the directed graph;

in response to receiving the edit:

modify, based on the edit, the directed graph; and determine that modifying the directed graph based on the edit causes a particular node of the directed graph to be isolated; and in response to determining that modifying the directed graph based on the edit causes the particular node of the directed graph to be isolated:

generate a hidden edge comprising an invisible graphical user element to connect the particular node of the directed graph to at least one other node of the plurality of nodes of the directed graph, wherein the invisible graphical user element comprises a data structure that is not visually displayed on the directed graph but recognized as being a connection between respective nodes of the plurality of nodes to act as a placeholder.

15. The non-transitory computer-readable storage medium of claim 14, wherein the hidden edge is stored as a data structure used for user interface specific data.

16. The non-transitory computer-readable storage medium of claim 14, wherein the hidden edge is not persisted to process data of the directed graph.

17. The non-transitory computer-readable storage medium of claim 14, wherein the directed graph is in temporarily unavailable state when the hidden edge is generated.

18. The non-transitory computer-readable storage medium of claim 14, wherein the directed graph is to adjust from a temporary unavailable state to an available state when the hidden edge is removed from the directed graph.

19. The non-transitory computer-readable storage medium of claim 14, wherein the hidden edge is to be removed from the directed graph when a new edge is added to the directed graph, the new edge including an end point at the particular node.

20. The non-transitory computer-readable storage medium of claim 14, wherein the plurality of edges are directed edges.

* * * * *